(12) United States Patent
Mikata et al.

(10) Patent No.: US 6,434,593 B1
(45) Date of Patent: Aug. 13, 2002

(54) DATA TRANSFER METHOD IN SYSTEM INCLUDING MULTIPLE PIECES OF EQUIPMENT AND SYSTEM FOR SUCH METHOD

(75) Inventors: Junko Mikata; Toru Ueda, both of Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/224,358

(22) Filed: Jan. 4, 1999

(30) Foreign Application Priority Data

Jan. 14, 1998 (JP) .......................................... 10-005907

(51) Int. Cl.[7] ............................................. G06F 15/16
(52) U.S. Cl. ..................... 709/200; 709/228; 709/238; 370/401
(58) Field of Search ................................. 709/200, 203, 709/205, 206, 217–219, 227–228, 244, 245, 238, 248, 250; 370/231, 402, 401, 426, 54, 60, 95.1, 85.12

(56) References Cited

U.S. PATENT DOCUMENTS

| 4,872,162 A | * | 10/1989 | Tanaka et al. ............ 370/85.12 |
| 5,437,024 A | * | 7/1995 | French |
| 5,452,291 A | * | 9/1995 | Eisenhandler et al. ......... 370/54 |
| 5,506,848 A | * | 4/1996 | Drakopoulos et al. ..... 370/95.1 |
| 5,781,178 A | * | 7/1998 | Roehm et al. .............. 345/157 |
| 5,937,168 A | * | 8/1999 | Anderson et al. ........... 709/238 |
| 5,938,735 A | * | 8/1999 | Malik ......................... 709/238 |
| 6,243,767 B1 | * | 6/2001 | Young ........................... 710/3 |

FOREIGN PATENT DOCUMENTS

JP 6-268653 9/1994

* cited by examiner

Primary Examiner—Ario Etienne
(74) Attorney, Agent, or Firm—Nixon & Vanderhye

(57) ABSTRACT

A method of transferring data in a system including a plurality of pieces of equipment capable of transferring data with one another includes the steps of preparing information to specify a data transfer function corresponding to a combination of source equipment and destination equipment in a machine-readable form, specifying source equipment through physical interaction with the source equipment, specifying destination equipment through physical interaction with the destination equipment, and operating the source equipment and the destination equipment to uniquely determine the data transfer function based on information related to the specified source equipment, information on the specified destination equipment, and the information to specify the data transfer function prepared in the machine-readable form, and to automatically execute transmission.

24 Claims, 27 Drawing Sheets

FIG.5

| SOURCE / DESTINATION | TV | VTR | ... | EQUIPMENT n |
|---|---|---|---|---|
| TV | NO CORRESPONDING FUNCTION | SOURCE EQUIPMENT 1 (REPRODUCING) DESTINATION EQUIPMENT 1 (LINE INPUT) <br> ... <br> SOURCE EQUIPMENT m DESTINATION EQUIPMENT m | ... | SOURCE EQUIPMENT 1 DESTINATION EQUIPMENT 1 <br> ... <br> SOURCE EQUIPMENT m DESTINATION EQUIPMENT m |
| VTR | SOURCE EQUIPMENT 1 (LINE OUTPUT) DESTINATION EQUIPMENT 1 (RECORDING) <br> ... <br> SOURCE EQUIPMENT m DESTINATION EQUIPMENT m | NO CORRESPONDING FUNCTION | ... | SOURCE EQUIPMENT 1 DESTINATION EQUIPMENT 1 <br> ... <br> SOURCE EQUIPMENT m DESTINATION EQUIPMENT m |
| ... | ... | ... | ... | ... |
| EQUIPMENT n | SOURCE EQUIPMENT 1 DESTINATION EQUIPMENT 1 <br> ... <br> SOURCE EQUIPMENT m DESTINATION EQUIPMENT m | SOURCE EQUIPMENT 1 DESTINATION EQUIPMENT 1 <br> ... <br> SOURCE EQUIPMENT m DESTINATION EQUIPMENT m | ... | NO CORRESPONDING FUNCTION |

130

DATA TRANSFER METHOD IN SYSTEM INCLUDING MULTIPLE PIECES OF EQUIPMENT AND SYSTEM FOR SUCH METHOD

BACKGROUND OF THE INVENTION

1. Field of the Invention

The present invention relates generally to improvements in linking process in information equipment such as electric home appliances and equipment intended for use in offices, connected by a digitized network, and more particularly, to improvements in data transfer functions when the same contents data is processed by a plurality of pieces of different information equipment linked with one another.

2. Description of the Background Art

With the advent of the developments in recent digitizing technology, a plurality of pieces of information equipment such as home electric appliances or equipment for office use are more often connected with one another by a digitized network. One of the characteristics of such a digitized network is that the same contents data is frequently processed by simultaneously linking a plurality of pieces of equipment. Images reproduced for example by a video tape recorder is output to a printer or displayed in a TV (television) monitor.

In conventional methods for these operations, a function to be achieved is specified for each of the apparatus. If, for example, a video image from a VCR is displayed by a TV, a "reproduction" command is applied to the VCR, while a With recent spread of personal computers (hereinafter simply as "PCs"), a virtual interface where contents data or the image of equipment is iconified is used as a user interface for data transmitting/receiving between such equipment, and data transmitting/receiving is specified between the equipment. When data on a computer is output to a printer, for example, the icon of the printer displayed on the picture plane of a PC or the like is selected as an output destination, and data to output is similarly specified by selecting an icon representing a data file or the like.

These conventional techniques have however encountered the following problems. When a video image from a VCR is displayed on a TV, the user simply desires to "watch video images". However, the user must give totally different kinds of commands, "reproduction" to the VCR and "switch to video input" to the TV. Therefore, instructions to be actually given are complicated and difficult compared with the simplicity of the request by the user.

When a virtual interface is used, the user must know the correspondence between available resources such as physical equipment or files and icons representing them on the virtual interface in order to make appropriate control. In order to pre-establish such correspondence, the network and equipment must be appropriately set beforehand. It was therefore difficult for the user not very familiar with the equipment to operate such a conventional virtual interface.

For example, assume that a plurality of controllable printers are present and data on a computer is to be printed out. In this case, the user must switch between the printers to output the data by referring to icons or names of equipment displayed on the virtual interface. If the user is not familiar with these icons or names of equipment, it would not be easy to output the data even to a printer which is located next to the user. Various advantages of the digitized network could not be utilized in this situation.

As one solution to this problem, Japanese Patent Laying-Open No. 6-268653 discloses an apparatus which dynamically changes the connection state of a plurality of audio-video equipment to a network. According to the technique disclosed by this document, when a command is given to a video-audio equipment connected to a network, the input/output line between the plurality of pieces of equipment connected to the network is dynamically switched depending upon the command.

By the technique disclosed by Japanese Patent Laying-Open No. 6-268653, however, the user interface is still difficult to understand for the user. Furthermore, when two devices are linked for processing, operation instructions must be given separately. Therefore, there is a need for a system which makes easier the linkage process between equipment when contents data is copied or moved between the equipment connected by a network or the like. Such a system may be applicable also to linkage process between applicants not necessarily connected by a network.

Some equipment such as a personal computer (and a network of personal computers), audio equipment, a television receiver, a video tape recorder, and an auto mobile having a navigation device and electronic devices each includes a number of sub elements (such as various peripheral devices connected to the personal computer, a cassette tape recorder, a CD (Compact Disc) player, an AM radio receiver and an FM radio receiver included in the audio equipment, and a satellite tuner and a ground wave tuner in the television receiver). The above-described problem is encountered when one of such sub elements is specified and data transfer between this element and another equipment is desired.

SUMMARY OF THE INVENTION

It is therefore an object of the present invention to provide a system and a method which permit a data transfer function between a plurality of pieces of information equipment to be more readily specified and equipment therefor.

Another object of the invention is to provide a system and a method and equipment therefor which permit a data transfer function to be more readily executed between a plurality of pieces of information equipment each including a plurality of sub elements.

Yet another object of the invention is to provide a system and a method which permit a data transfer to be automatically executed by specifying source equipment and destination equipment through physical interaction with such equipment in a plurality of pieces of information equipment and equipment transfer.

A still further object of the invention is to provide a system and a method which permit an appropriate data transfer depending upon a combination of equipment to be automatically executed, by specifying source equipment and destination equipment through physical interaction with such equipment in a plurality of pieces of information equipment and equipment therefor.

A still further object of the invention is to provide is a system and a method which permit a data transfer to be automatically executed, by specifying a sub element included in a source equipment and a sub element included in destination equipment through physical interaction with these elements in an a plurality of pieces of information equipment each including a plurality of sub elements and equipment therefor.

An additional object of the invention is to provide a system and a method which permit an appropriate data transfer depending upon a combination of sub element equipment to be automatically executed, by specifying sub element equipment included in a source equipment and a sub element equipment included in destination equipment and equipment therefor.

A data transfer method according to the present invention is utilized in a system including a plurality of pieces of equipment capable of transferring data with one another. The method includes the steps of preparing information to specify a data transfer function depending upon a combination of source equipment and destination equipment in a machine-readable form, specifying the source equipment through physical interaction with the source equipment, specifying the destination equipment through physical interaction with the destination equipment, and operating the source equipment and destination equipment to uniquely determine a data transfer function based on information related to the specified source equipment, information related to the specified destination equipment, and the information to specify a data transfer function prepared in the machine-readable form and to automatically execute transmission.

When the source equipment is specified through physical interaction and the destination equipment is specified through physical interaction, a data transfer function is uniquely determined based on the information related to the source and destination and the prepared information to specify the data transfer function and a data transfer is executed automatically. Different commands do not have to be given separately for the source and destination. Since the source equipment and destination equipment are specified through physical interaction, the user does not have to be familiar with the correspondence between the equipment and the corresponding icons unlike the case of using a virtual interface. As a result, a data transfer associated with linking process between equipment may be readily specified.

The source or/and destination equipment each preferably includes a plurality of sub elements functioning separately from one another. The preparing step includes the step of preparing information to specify data transfer functions depending upon possible combinations of sub elements in the source equipment and sub elements in the destination equipment in a machine-readable form. The step of specifying the source equipment includes the step of specifying one of the sub elements in the source equipment through physical interaction with the sub element. The step of specifying the destination equipment includes the step of specifying one of the sub elements in the destination equipment through physical interaction with the sub element. The step of operating the source equipment and destination equipment includes the step of uniquely determining a data transfer function based information on the specified source sub element, information on the specified destination sub element, and the information to specify the data transfer function, thereby operating the source sub element and the destination sub element to automatically execute transmission.

More preferably, the step of operating the source sub element and the destination sub element includes the steps of extracting a data transfer function based information on the specified source sub element, information on the specified destination sub element, and the information to specify the data transfer function, selecting one of a plurality of data transfer functions according to a predetermined determination method if such a plurality of data transfer functions are extracted, and operating the source sub element and the destination sub element to automatically execute transmission according to the selected data transfer function.

For example, with an audio equipment including a plurality of sub elements such as a CD (Compact disc) player, a cassette tape recorder, and a tuner, a data transfer function cannot be specified simply by specifying the audio equipment as a source or destination. Thus, in such a case, each of the sub elements constituting the equipment is specified as a unit of source or destination. Thus, a data transfer function between equipment having a plurality of sub elements may be readily specified.

More preferably, the step of operating the source equipment and destination equipment includes the steps of extracting a data transfer function based on information related to the specified source equipment, information related to the specified destination equipment, and information to specify the data transfer function, selecting one of a plurality of data transfer functions according to a predetermined determination method when such a plurality of data transfer functions are extracted, and operating the source equipment and destination equipment to automatically execute transmission according to the selected data transfer function.

If the source equipment and destination equipment are both uniquely determined, the data transfer function is not always determined uniquely when each equipment has a number of functions. Hence, if a plurality of data transfer functions are extracted, one data transfer function is selected by the user or extracted according to a rule to determine a predetermined priority. Thus, the data transfer between multifunctional equipment may be readily specified.

A data transfer system according to another aspect of the present invention includes a network, a plurality of pieces of equipment connected to the network, a unit to specify a source equipment through physical interaction with the source equipment, a unit to specify destination equipment through physical interaction with the destination equipment, and a unit to uniquely determine a data transfer function based on the combination of the source equipment and destination equipment specified for execution.

When the source and destination are specified through physical interaction, a data transfer function is uniquely determined based on the combination and executed. Since a data transfer function between equipment is specified through physical interaction with source equipment and destination equipment, the load of identifying the source and destination by the user is alleviated, resulting in easier operation involved in the transfer.

More preferably, the unit to specify a source is provided for each of possible source equipment and the unit to specify a destination is provided for each of possible destination equipment.

Source equipment and destination equipment may be specified by operating units provided in them. Therefore, unlike the case of using a virtual interface, the user does not have to be familiar with the correspondence between abstract indications such as icons and actual equipment.

The data transfer system preferably further includes a separate remote control device not connected to the network. The remote control device can communicate separately with a plurality of pieces of equipment. The remote control device includes a source specifying device and a destination specifying device.

Using the remote control device capable of communicating separately with the equipment, source and destination equipment may be specified. As compared to the case of using a virtual interface, the source and destination may be more readily distinguished from each other. As a result, equipment may more readily specified.

Further preferably, the source equipment or destination equipment each includes a plurality of sub elements functioning separately from one another. The device to specify source equipment includes a device to specify one of the sub elements included in the source equipment through physical interaction with the sub element. The device to specify destination equipment includes a device to specify one of the sub elements in the destination equipment through physical interaction with the sub element. A transfer execution device includes a device to uniquely determine a data transfer function based on information related to the specified source sub element, information related to the specified destination sub element, and the information to specify the data transfer function and operates the source sub element and destination sub element to automatically execute transmission.

When the source equipment or destination equipment includes a plurality of sub elements functioning separately from one another, one of the sub elements may be specified as a unit source or destination. Therefore, a data transfer function associated with linking process between equipment including a plurality of sub elements may be readily specified.

According to yet another aspect of the present invention, a device to specify a transfer equipment includes a unit connected to the network to receive data source information and data destination information from the network, and a unit to uniquely determine a function to be executed by the source equipment and a function to be executed by the destination equipment based on the received source information and destination information and to provide corresponding indications to the source equipment and destination equipment through the network.

By specifying the source equipment and destination equipment, the functions to be executed by the source equipment and destination equipment are uniquely determined and specified in this unit to specify the transfer equipment. The user may specify a desired data transfer function simply by specifying the source and destination.

A remote control device in a network equipment according to yet another aspect of the invention communicates separately with a plurality of pieces of equipment connected to a network to control such equipment, and includes a unit to specify equipment with which it communicates as a data transfer source, and a unit to specify equipment with which it communicates as a data transfer destination.

Using the remote control device in the network equipment, the data transfer source or destination is separately specified, and therefore the user may identify equipment to be specified when the source or destination is specified. As compared to the case of using a virtual interface, the specifying of the source and destination may be more easily understood.

In a remote control device according to yet another aspect of the present invention controls a plurality of pieces of equipment by remotely separately communicating with the equipment. The remote control device includes a communication device capable of remote communication separately with the plurality pieces of equipment, a unit to receive source information from equipment specified as a data transfer source equipment among the plurality pieces of equipment, a unit to transmit the source information to destination equipment, a unit to receive information to specify a data transfer function to be executed by the source equipment from the destination equipment, a unit to provide the received information to specify the transfer function to the source equipment, a unit to receive Hi the data applied according to the specified data transfer function from the source equipment and temporarily storing the data, and a unit to transmit the temporarily stored data to the destination equipment according to the specified data transfer function.

If the source equipment and destination equipment are not connected by a network, data may transferred via the remote control device serving as a buffering device.

Information equipment according to a still further aspect of the present invention includes a functional portion to implement a prescribed information processing function, a control circuit to control the functional portion and a network interface provided between the control circuit and the network, and a processing indication unit to receive source and destination information for a data transfer to be executed through the network, uniquely determine the data transfer function, and provide control unit for the source equipment and the control circuit in the destination equipment with information to specify the processings to be executed by them.

The processing indication unit uniquely determines the data transfer function based on the received source and destination information and indicates to the source equipment and destination equipment about the processings to be executed by them. The user does not have to give an instruction to the source equipment and destination equipment about the function to be executed by them. As a result, a data transfer associated with linking process between information equipment may be readily specified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a function correspondence table used according to the first embodiment;

DESCRIPTION OF THE PREFERRED EMBODIMENTS

First Embodiment

Figure 1:
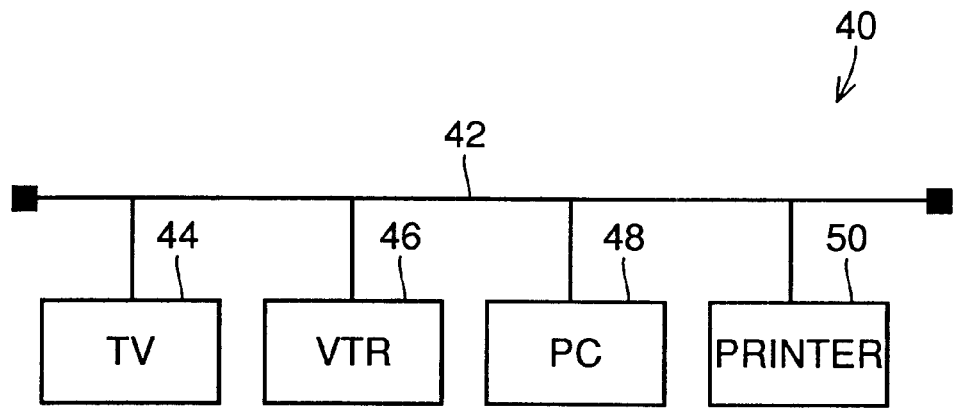
FIG. 1 is a diagram of a system according to a first embodiment of the present invention.

Referring to FIG. 1, a system 40 according to a first embodiment of the present invention includes a network 42, and information equipment connected to network 42 including a TV 44, a video tape recorder 46, a PC 48 and a printer 50. It is understood that the information equipment in FIG. 1 are shown simply by way of illustration, and a larger number of pieces of information equipment or less number of pieces of equipment may be connected to network 42.

Figure 2:
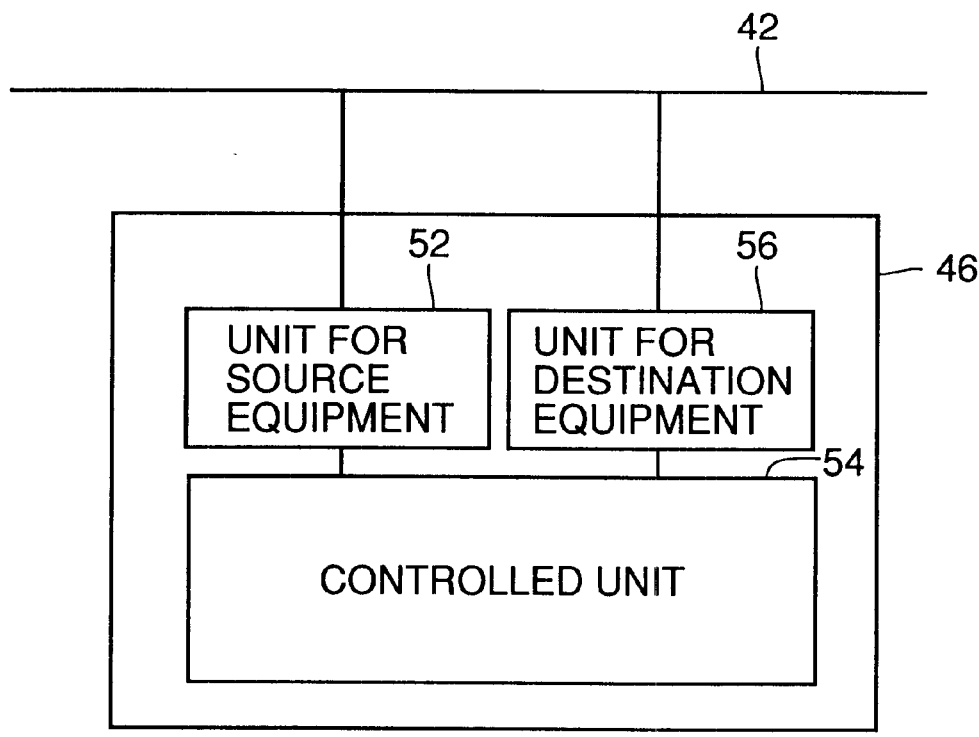
FIG. 2 is a block diagram of information equipment according to the first embodiment.

The structure of video tape recorder 46 is shown in FIG. 2 as an example of the information equipment. Other information equipment, have a similar structure to video tape recorder 46 although they are different in the functions of controlled portions.

Referring to FIG. 2, video tape recorder 46 includes controlled equipment 54 functioning as a video tape recorder, and a unit for source equipment 52 and a unit for destination equipment 56 both connected between network 42 and controlled equipment 54. A unit for source equipment 52 is provided in possible source equipment for data transfer. A unit for destination equipment 56 is provided in possible destination information equipment in data transfer. Video tape recorder 46 shown in FIG. 2 which could be both a source and a destination for data includes both units 52 and 56. A unit which only serves as a destination for data such as a printer, for example, does not need a unit for source equipment 52. Equipment which only serves as a source for data such as a reproduction-only video tape recorder does not need destination equipment unit 56.

Figure 3:
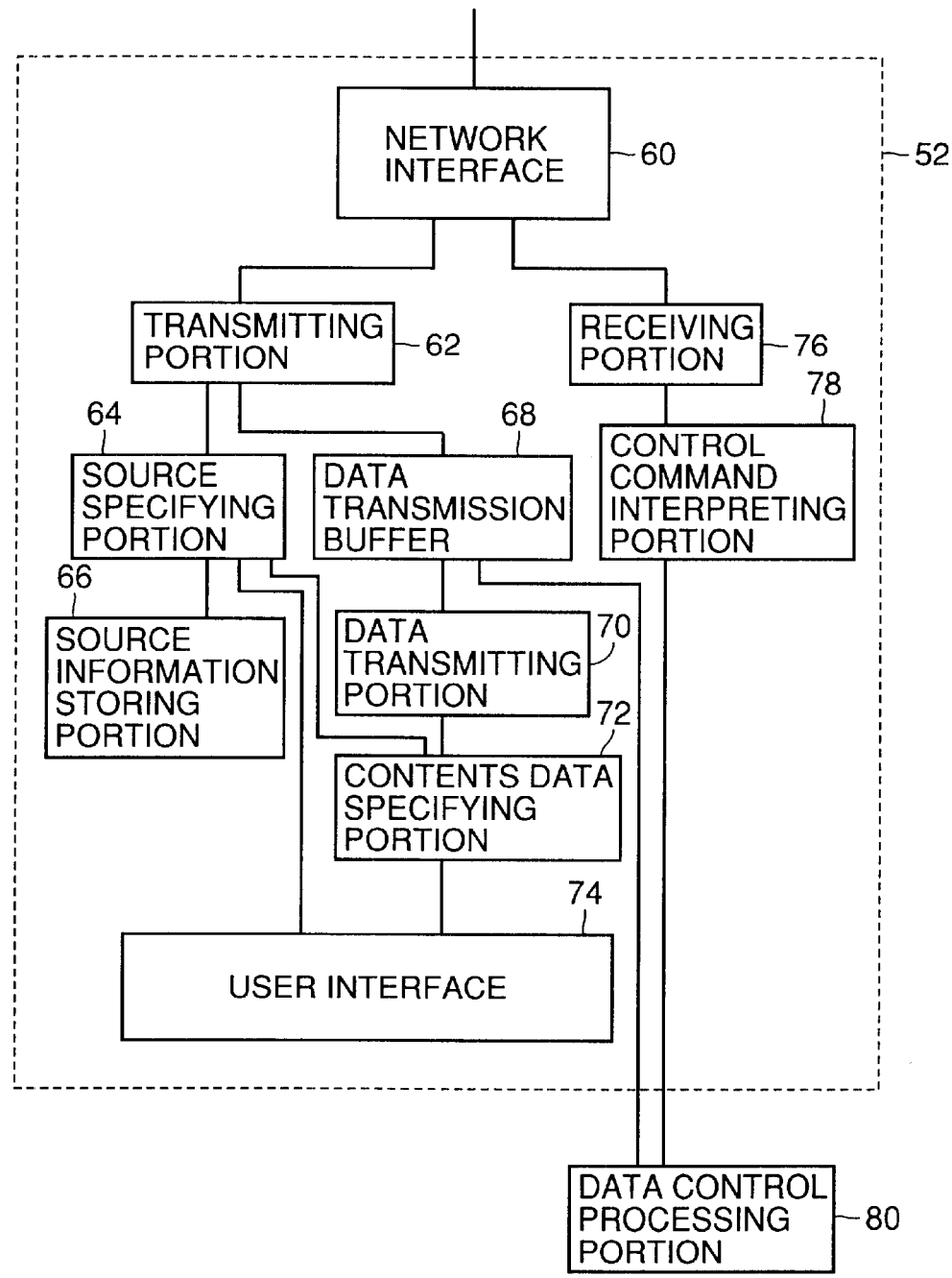
FIG. 3 is a block diagram of a unit for source equipment according to the first embodiment.

Referring to FIG. 3, a unit for source equipment 52 includes a network interface 60 having information to map a network identifier necessary for communication with an equipment identifier to identify specified equipment and adding appropriate information to the header of a packet transmitted/received or interpreting the header, a transmitting portion 62 and a receiving portion 76 both connected to network interface 60, a data transmission buffer 68 connected to transmitting portion 62, a data transmitting portion 70 connected to data transmission buffer 68 to execute data transmission, a source information storing portion 66 to store source information when video tape recorder 46 is a source, a user interface 74 used by the user to select video tape recorder 46 as a source and to specify contents data to be transferred, a contents data specifying portion 72 connected to user interface 74 to perform processing to specify contents data to be transferred, a source specifying portion 64 receiving an input to user interface 74 and the output of contents data specifying portion 72 and executing a processing to specify the source, thereby broadcasting the source information stored in source information storing portion 66 onto the network through transmitting portion 62, and a control command interpreting portion 78 for interpreting a control command received from the network through network interface 60 and receiving portion 76. Data transmission buffer 68 and control command interpreting portion 78 are connected to a data control processing portion 80 provided in controlled equipment 54 shown in FIG. 2.

Figure 4:
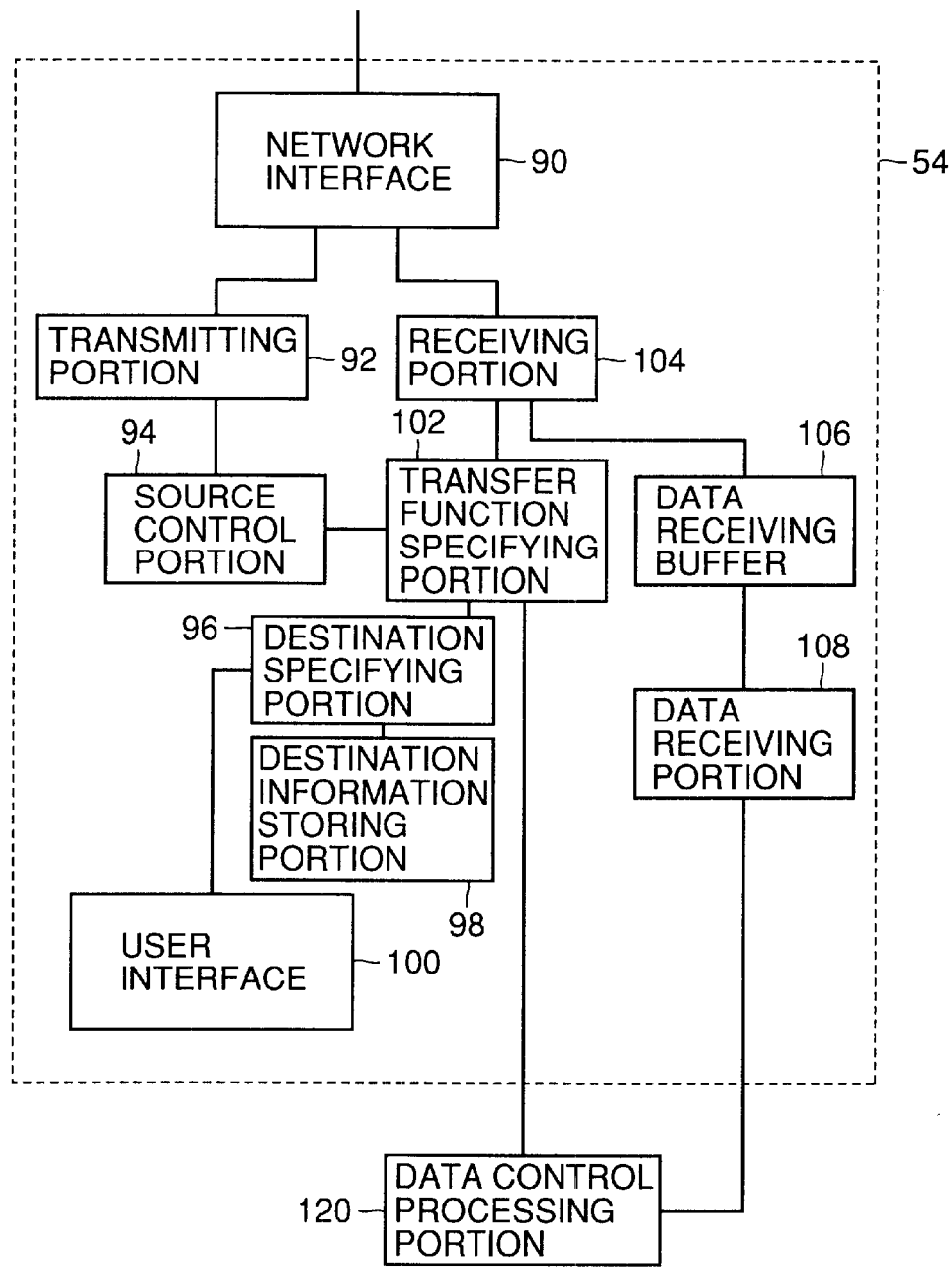
FIG. 4 is a block diagram of a unit for destination equipment according to the first embodiment.

Referring to FIG. 4, a unit for destination equipment 56 includes a network interface 90 having information to map a network identifier necessary for communication with an equipment identifier to identify specified equipment and adding appropriate information to the head of a packet transmitted/received, and interpreting the header, a transmitting portion 92 and a receiving portion 104 connected to network interface 90, a user interface 100 used by the user to specify video tape recorder 46 as a destination, a destination information storing portion 98 to store destination information used for processing to specify a data transfer function when video tape recorder 46 is selected as a destination, a destination specifying portion 96 receiving the output of user interface 100 and the output of destination information storing portion 98 and performing processing to specify the destination, a data control processing portion 120 provided in controlled equipment 54 shown in FIG. 2, a transfer function specifying portion 102 connected to receiving portion 104 and destination specifying portion 96 to perform processing to specify a data transfer function, a source control portion 94 to transmit a control command to control a source according to the function by the source depending upon the specified data transfer function to the source through transmitting portion 92 and network interface 90, a data receiving buffer 106 to receive the transfer data received through receiving portion 104 and network interface 90, and a data receiving portion 106 to receive the output of data receiving buffer 106 and to execute a processing. Data receiving portion 108 applies the processed data to a data control processing portion 120.

Any user interface to specify a source or destination needs only be operated by the operator through physical interaction. Anything as simple as a push button or lever may be employed, or anything to specify by physically pressing indications on the interface may be employed.

Transfer function specifying portion 102 has equipment correspondence information stored as information in a table form including combinations of equipment and information to specify data transfer functions corresponding to the combinations. FIG. 5 shows this equipment correspondence information 130.

Referring to FIG. 5, equipment correspondence information 130 includes source side functions and destination side functions corresponding to combinations of sources and destinations and attributes. Referring to FIGS. 5, if the source is a video tape recorder and the destination is a TV, for example, information to specify reproduction as a first source function and line input as a first destination function is prepared in a machine-readable form. There may be a plurality of combinations of functions for this combination. In FIG. 5, a plurality of combinations of functions are shown as source functions 1 to m. In FIG. 5, the case in which the source and destination are the same is labeled "no corresponding function". Source information storing portion 66 in FIG. 3 and destination information storing portion 98 in FIG. 4 each store functions which can be implemented by its equipment, and attribute information used as information to complement the functions. The stored form of the source information or destination information is shown in FIG. 6.

Figure 6:
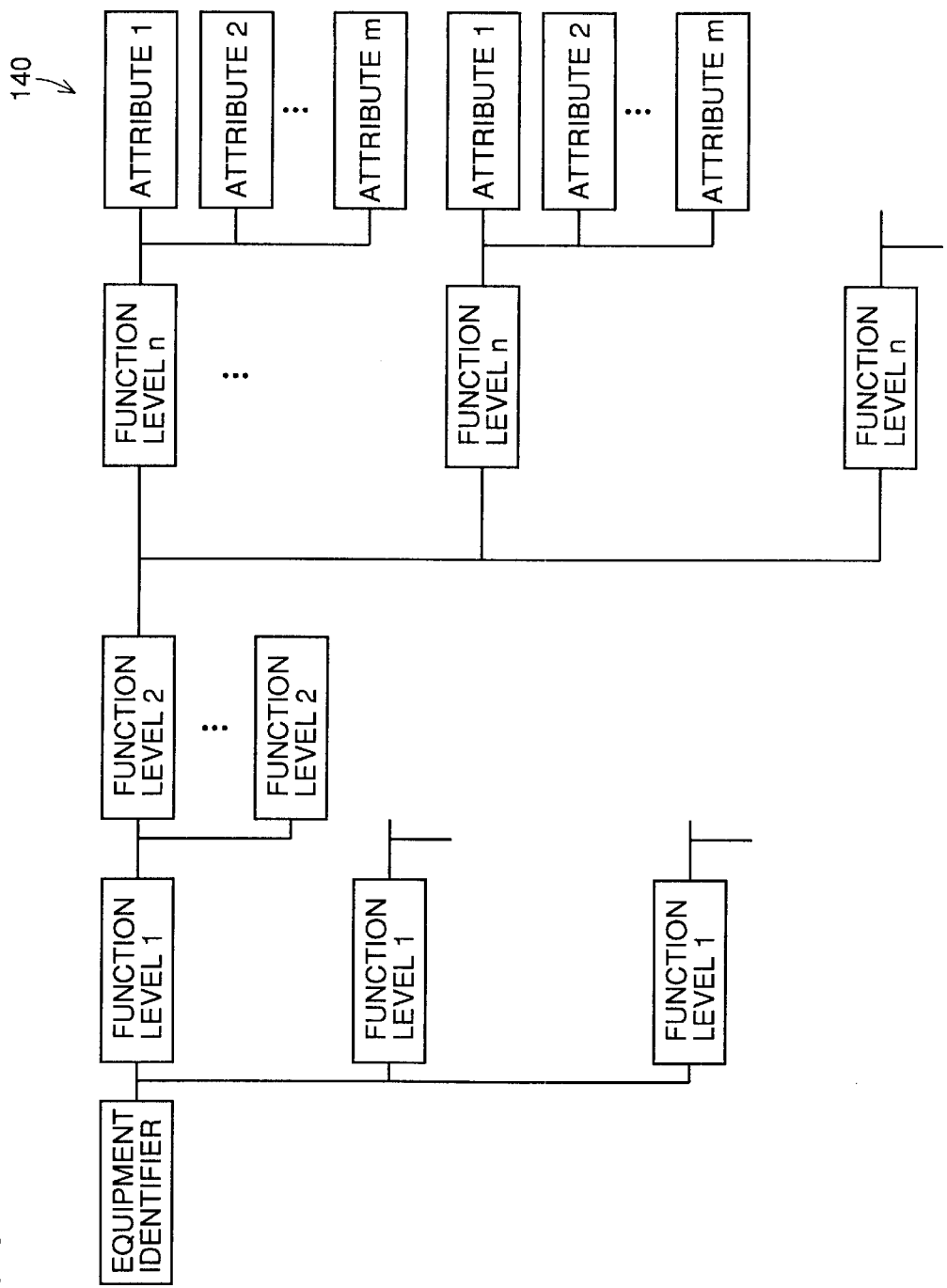
FIG. 6 is a table showing the functions of the equipment.

Referring to FIG. 6, source information or destination information 140 is configured in a tree structure having an equipment identifier to identify its equipment as the root. Information to specify functions which can be implemented by its equipment is stored in a hierarchy as function level 1 to function level n toward the leaves of the tree structure. The attribute information (attribute 1 to m) of the function is added to each of the lowermost function level m.

Figure 7:
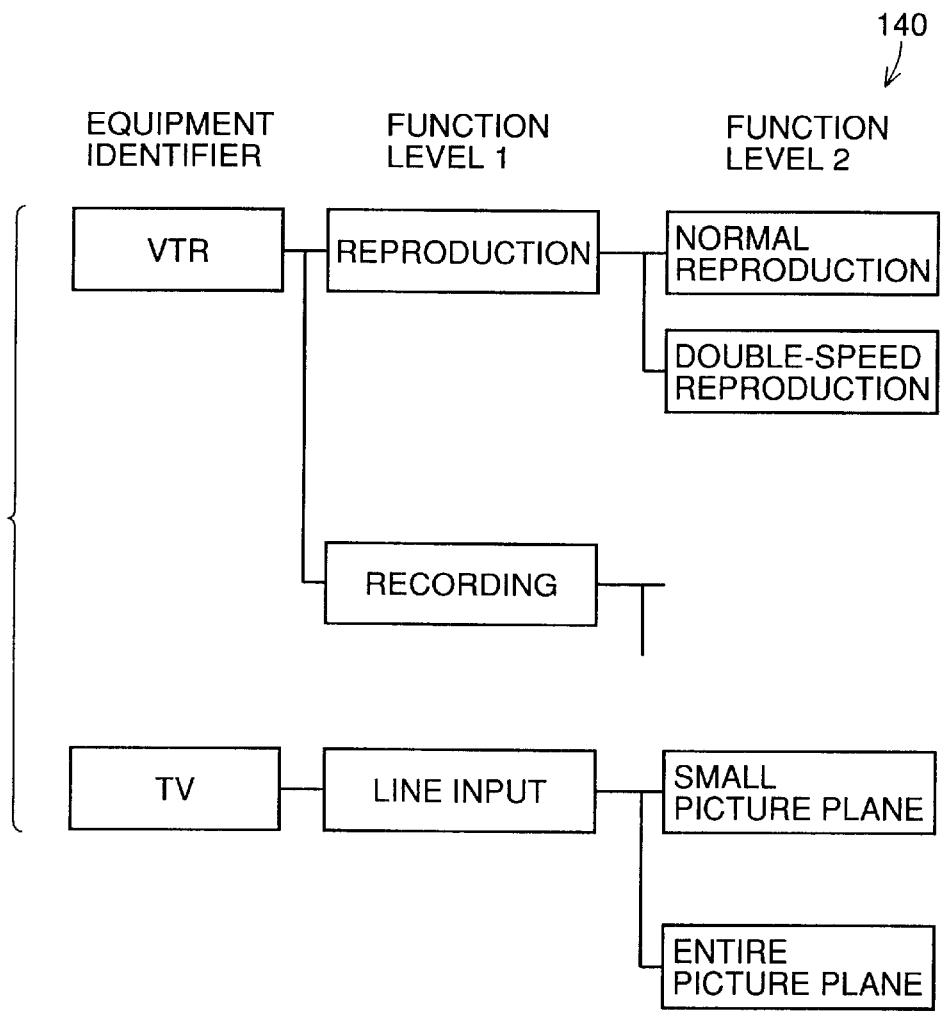
FIG. 7 is a diagram showing specifics of the functional table.

Referring to FIG. 7, in the case of a video tape recorder, reproducing and recording functions are defined as a function level 1 by way of illustration. Further for the reproducing function, normal reproduction and double-speed reproduction are defined as function level 2. Similarly, the case of a TV, line input is defined as function level 1, and small picture display and entire picture display are defined as function level 2 corresponding to the line input. FIG. 7 shows only examples, and various functions at various levels are predefined according to equipment and stored in source information storing portion 66 or destination information storing portion 98.

Figure 8:
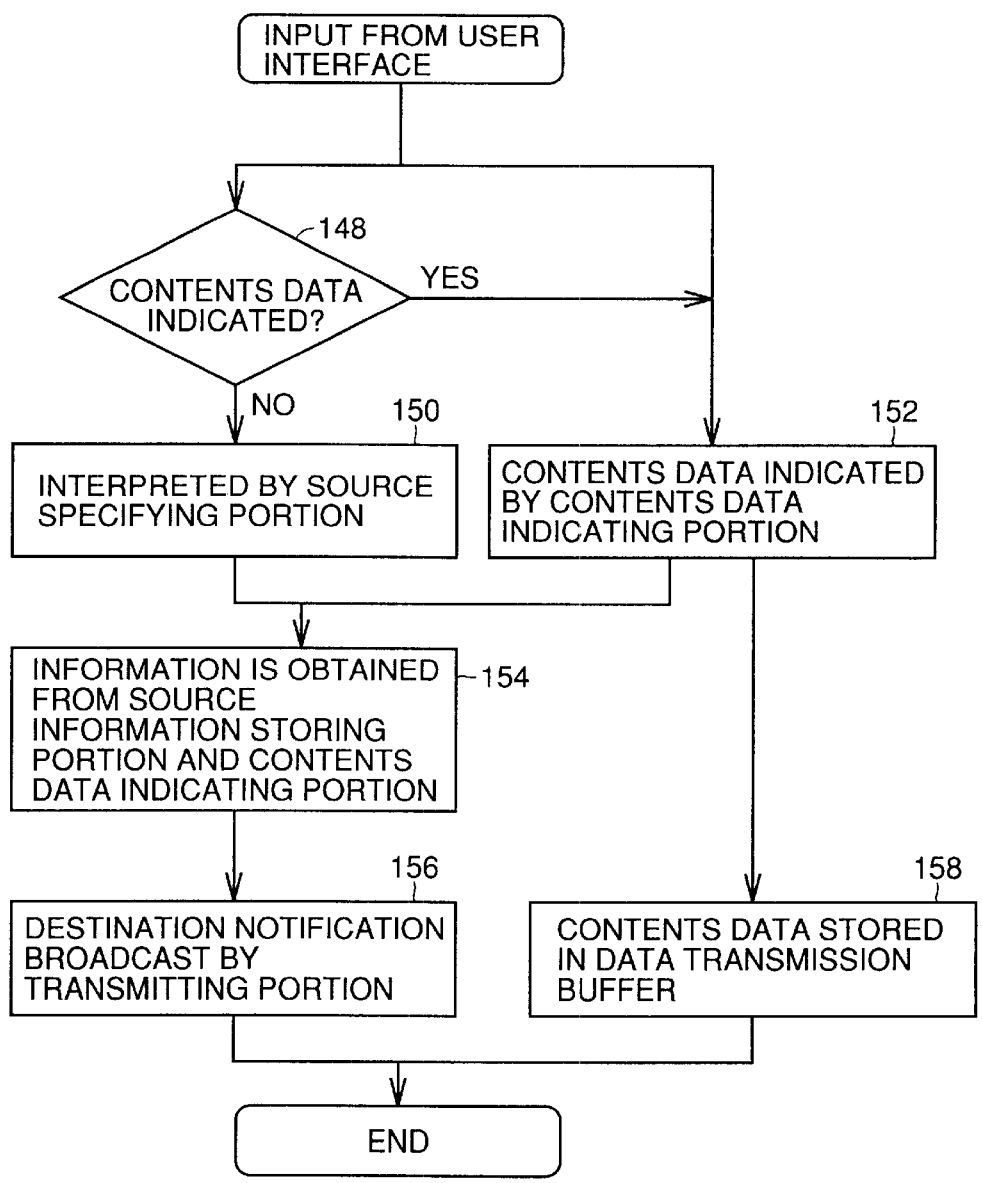
FIG. 8 is a flow chart for use in illustration of a process in the unit for destination equipment according to the first embodiment.

FIG. 8 shows the operations of unit for source equipment 52 in a flow chart form. Unit for source equipment 52 can receive both an input from user interface 74 and an input through network interface 60. This applies to the case of unit for destination equipment 56 (see FIG. 2).

FIG. 8 shows the operations of unit for source equipment 52 when there is an input from user interface 74 in a flow chart form. The specifying of the source equipment and the specifying of transfer contents data are performed through user interface 74. If the transfer contents data is not specified, transfer contents data is determined according to a predetermined determination method based on predefined equipment information in source information storing portion 66 (148).

Referring to FIG. 8, when source equipment and transfer contents data are specified from the user interface, the source specifying portion interprets the specifying of the source equipment (150). Similarly, contents data specifying portion 152 directs contents data depending upon the specifying of contents data from user interface 74 (152). Then, source specifying portion 64 obtains source information stored in source information storing portion 66 and information to specify the contents data from contents data specifying portion 72 (154). Source specifying portion 64 further broadcasts a destination notifying packet to the network through transmitting portion 62 and network interface 60 (156).

In response to a direction from contents data specifying portion, data transmission buffer 68 receives the contents data from data control processing portion 80 and starts storing the data.

Figure 9:
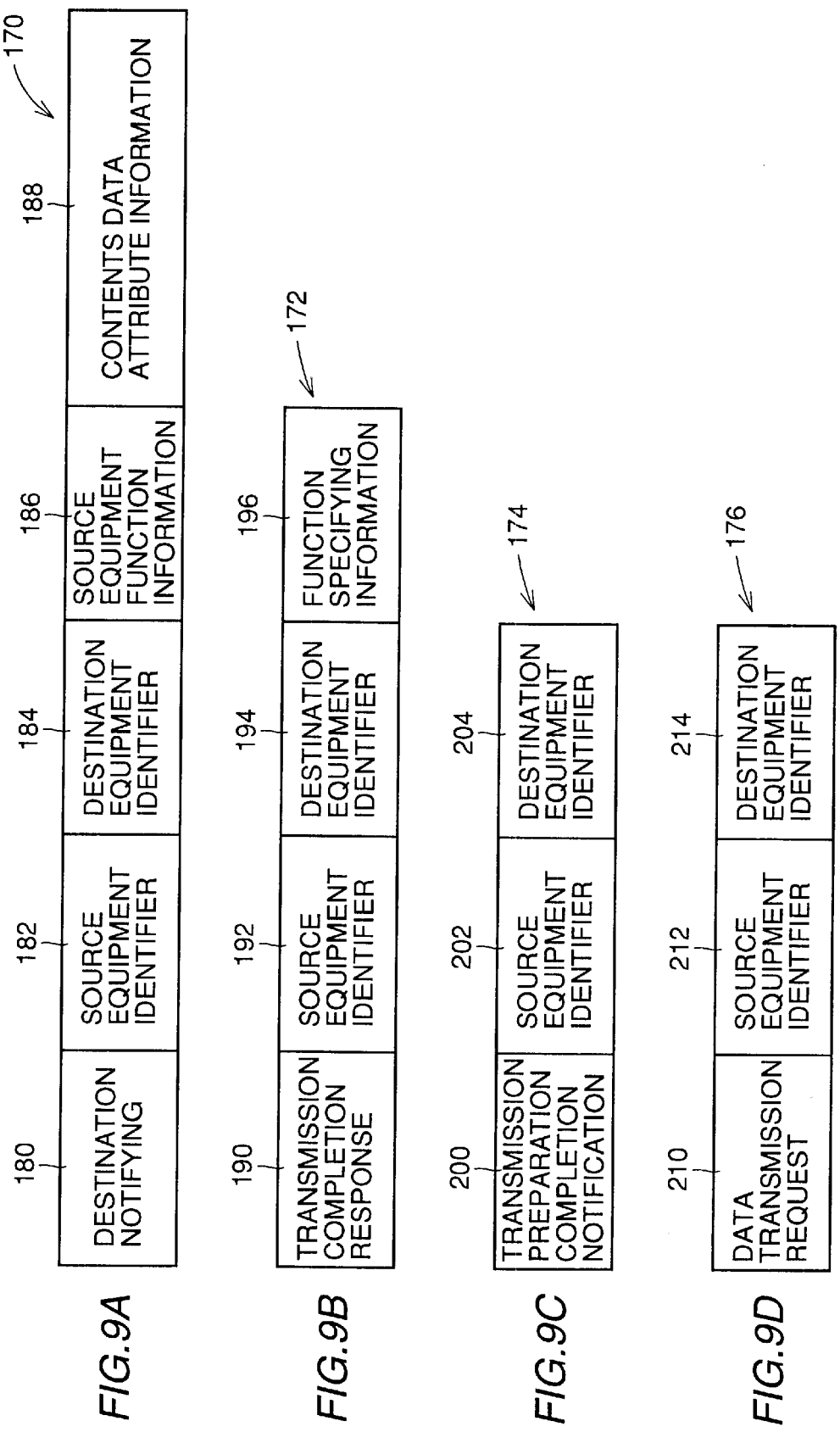
FIGS. 9A to 9D are diagrams showing the formats of packets used in the system according to the first embodiment.

FIG. 9A shows the format of the destination notifying packet. Referring to FIG. 9A, destination notifying packet 170 includes information 180 indicating that it is a destination notifying packet, a source equipment identifier 182, a destination equipment identifier 184, source equipment function information 186 and contents data attribute information 188.

Information 180 representing that it is a destination notifying packet is a predetermined code. Source equipment identifier 182 is an identifier to specify equipment specified as the source. Destination equipment identifier 184 is identification data to specify the destination equipment in a normal case, but in the case of the destination notifying packet, the identifier is a particular value representing that it is a broadcast packet. It is for example a value, all the bits of which are "1".

Source equipment function information 186 and contents data attribute information 188 are information on the source equipment available from source information and the attribute information of the contents data specified using contents data specifying portion 72, respectively.

Contents data specifying portion 72 performs processing to make the user select the contents data using user interface 74. For example, if the controlled equipment is a CD player, contents data specifying portion 72 displays the title numbers of a CD on the display of user interface 74 to permit the user to select one title number. The selected title number is contents data specifying information in this case.

FIGS. 9B to 9D show other formats of packets used for data transfer processing, a detail of which will be described later.

Figure 10:
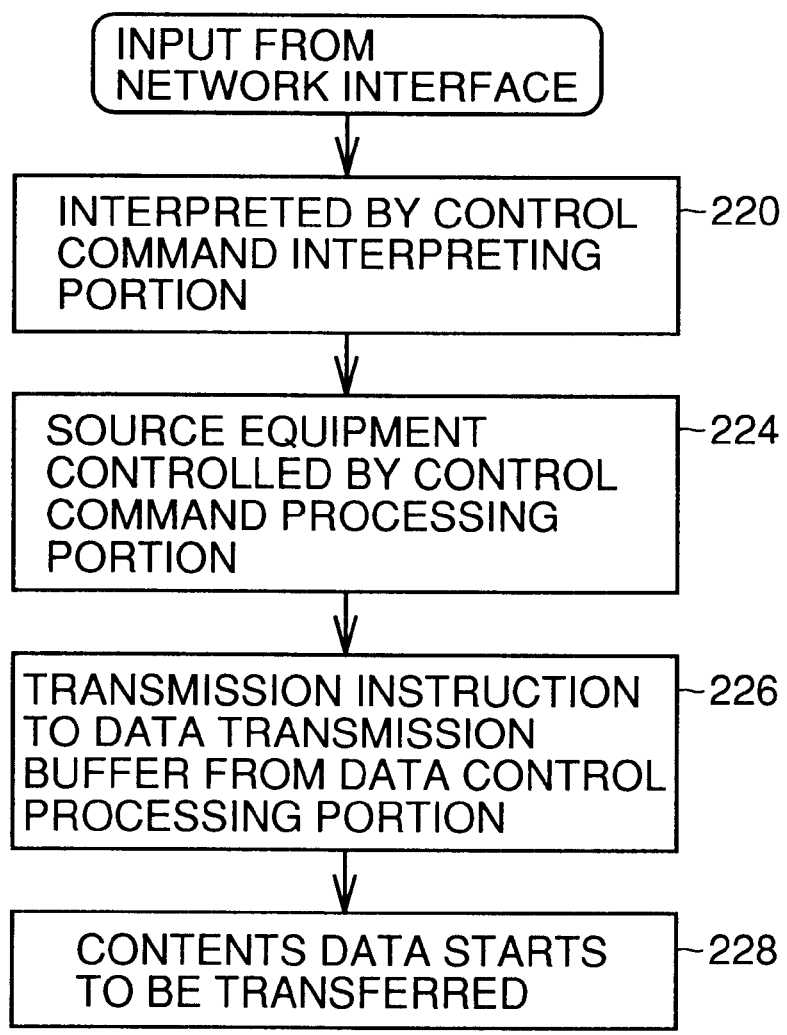
FIG. 10 is a flow chart for use in illustration of a process in the unit for source equipment according to the first embodiment.

FIG. 10 shows in a flow chart form functions implemented by a unit for source equipment 52 when there is an input to a unit for source equipment 52 through network interface 60. Control command interpreting portion 78 interprets a function specified by a control command received through receiving portion 76 (220). Data control processing portion 80 controls the source equipment (controlled equipment) according to the interpreted function to perform an appropriate operation. Subsequently, data control processing portion 80 instructs transmission to data transmission buffer 68 (226). Data transmission buffer 68 starts transferring contents data through transmission portion 62 and network interface 60 in response to this transmission instruction.

The control command received by control command interpreting portion 78 is applied from unit for destination equipment 56 as will be described, and is a packet having a format shown in FIG. 9B, a detail of which will be described later.

Figure 11:
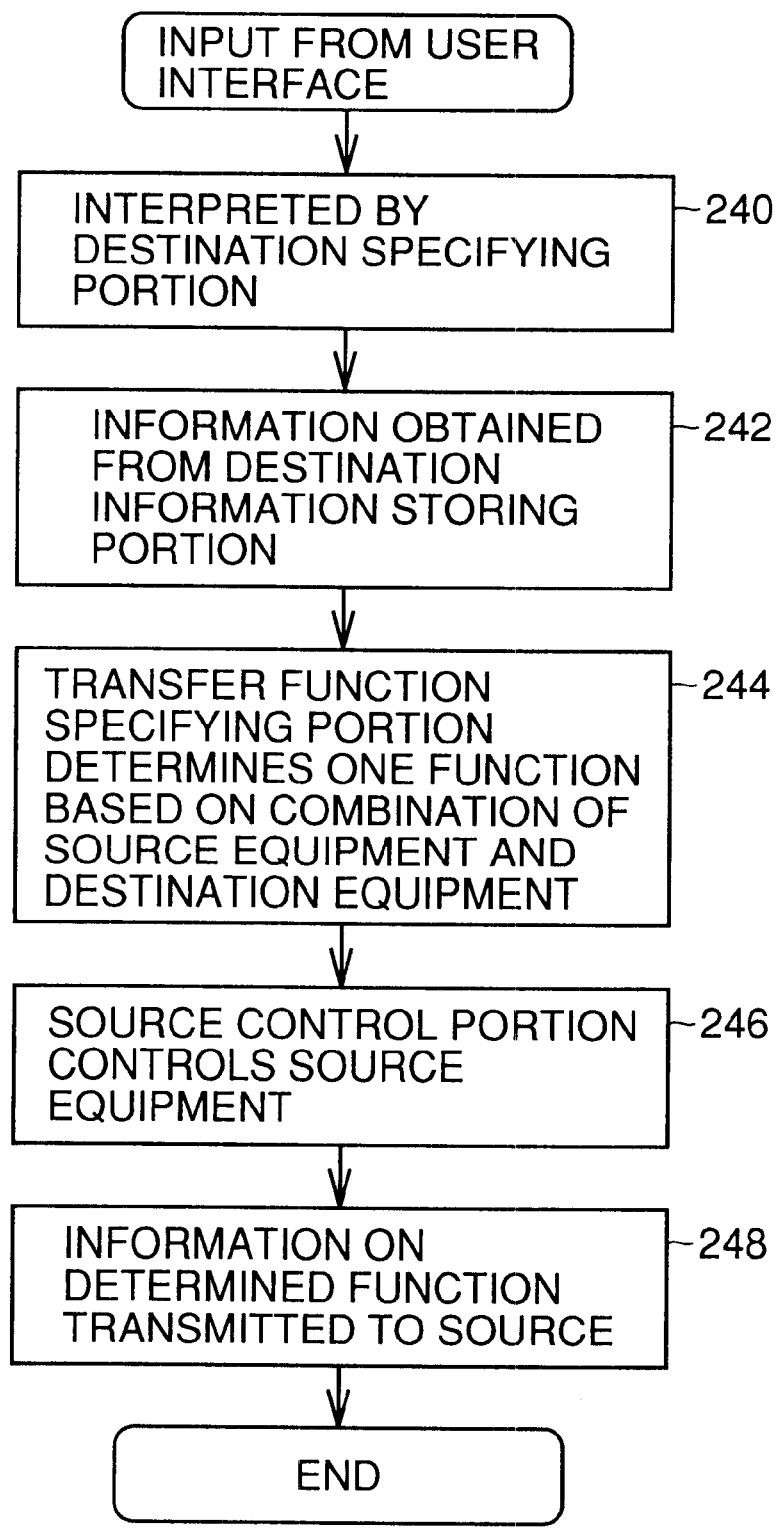
FIG. 11 is a flow chart for use in illustration of the unit for destination equipment according to the first embodiment.

FIG. 11 shows in a flow chart form processing executed when a unit for destination equipment 56 receives an input through user interface 100. Note that before the processing, a destination notifying packet transmitted from unit for source equipment 52 is received and temporarily stored in units for source equipment in all the equipment, and the processing will be described later by referring to FIG. 13.

Information input through user interface 100 is an input to specify equipment having unit for destination equipment 56 as a destination.

Referring to FIG. 4, destination specifying portion 96 interprets through user interface 100 that it is specified as a destination (240). In response to the input, destination specifying portion 96 obtains information related to its equipment from destination information storing portion 98 (242). Then, transfer function specifying portion 102 determines one combination of a source function and a destination function from the equipment correspondence information shown in FIG. 5 based on the combination of already received information related to the source equipment and destination equipment, i.e., its equipment. The processing will be now described by referring to FIG. 12.

Figure 12:
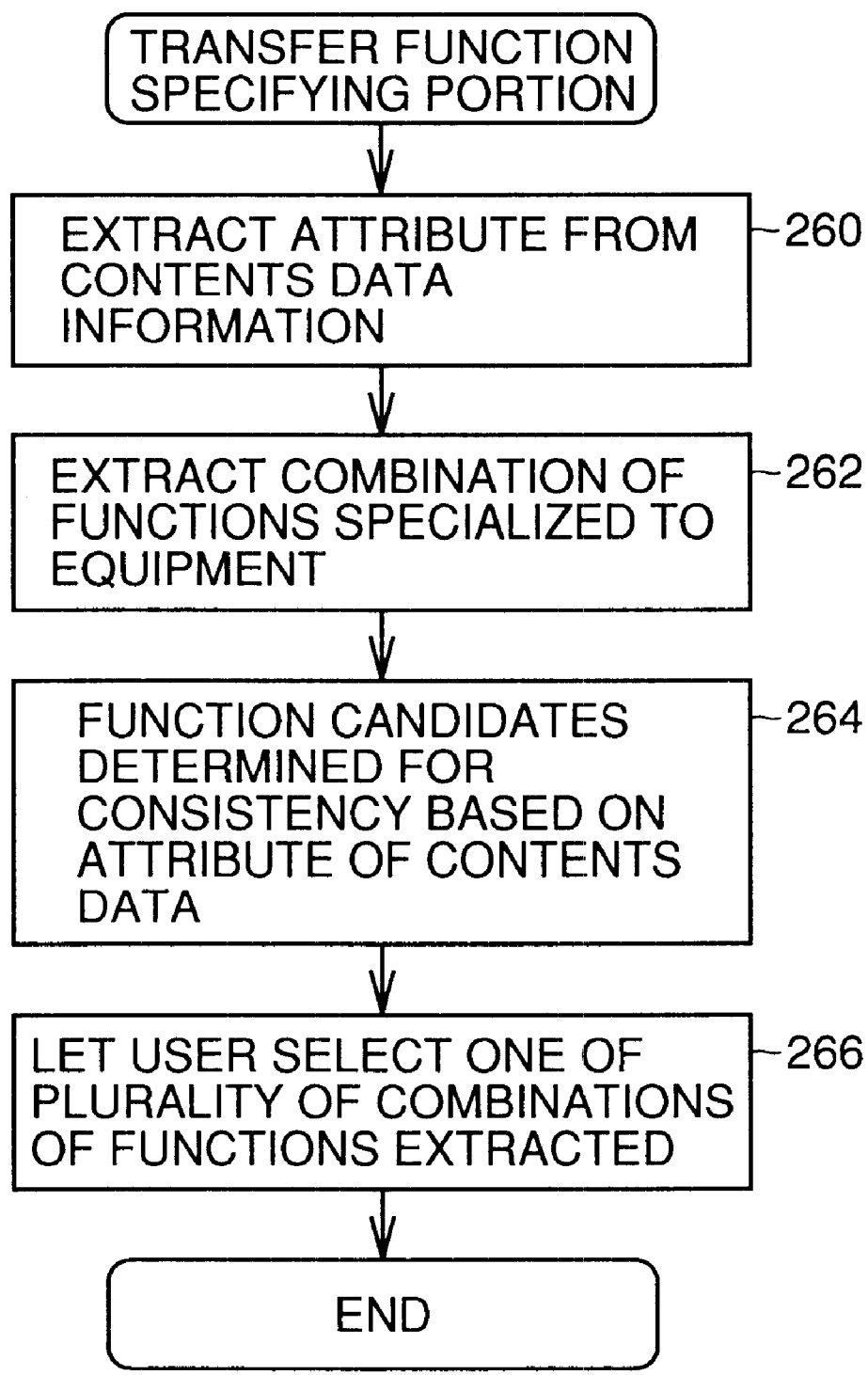
FIG. 12 is a flow chart for use in illustration of a process executed by a transfer function specifying portion.

Referring to FIG. 12, transfer function specifying portion 102 first extracts the attribute of contents data based on contents data information in a destination notifying packet (260). Then, transfer function specifying portion 102 extracts combinations of functions specific to a combination of particular source equipment and its equipment (destination equipment) (262). Among thus extracted function candidates, it is determined whether any candidate is consistent with the attribute of the contents data extracted in step 260 (264). By referring to equipment correspondence information 130 shown in FIG. 5, for example, let us now assume that the source equipment is a TV and the destination equipment is a video tape recorder. In this case the line output function is extracted as a function candidate for the source and the recording function for the destination. These functions are attached with an attribute information as shown in FIG. 6. In step 264, the attribute of contents data and the attributes of the extracted source function and destination function are determined for consistency. If the attribute of the contents data is animated images, and the line output and recording functions have an audio visual image attribute, the consistency is determined to be correct, and otherwise it is determined incorrect.

If there are a plurality of combinations of extracted functions, user interface 100 is used to make the user select one combination according to this embodiment (266). The processing in transfer function specifying portion thus is completed. Referring back to FIG. 11, when one data transfer function is determined, transfer function specifying portion 102 gives a control command to specify a function to be executed by its equipment to data control processing portion 120. Meanwhile, source control portion 94 performs a processing to control the source equipment according to the specified data transfer function. More specifically, information to specify the determined data transfer function is transmitted to the source through transmitting portion 92. A packet format in this case is shown in FIG. 9B. The packet is called transfer function completion response packet.

Referring to FIG. 9B, a transfer function completion response packet 172 includes information 190 representing that the packet is a transfer completion response packet, a source equipment identifier 192, destination equipment identifier 194, and information 196 to specify a function to be executed by the source among data transistor functions specified by transfer function specifying portion 102.

Figure 13:
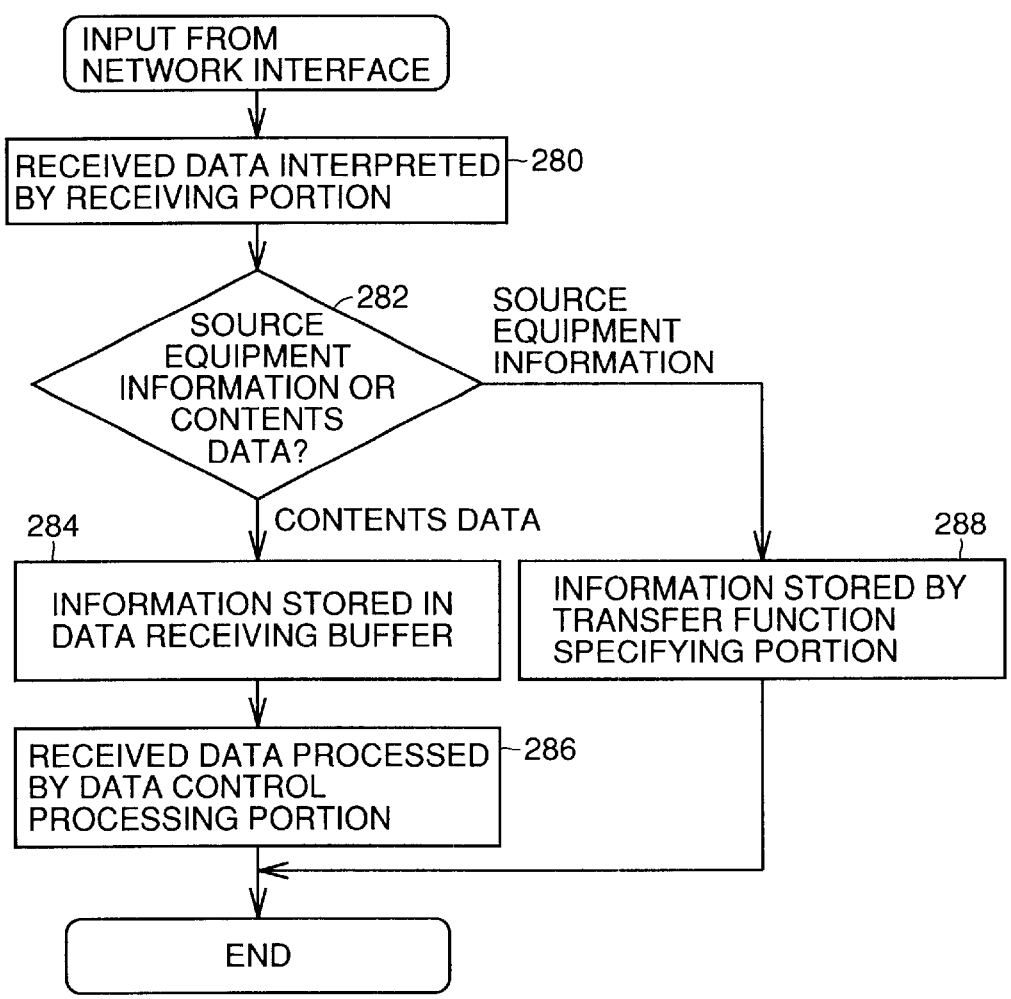
FIG. 13 is a flow chart showing a process in the unit for destination equipment in the system according to the first embodiment.

Referring to FIG. 13, the operations of unit for destination equipment 56 when there is an input from network interface 90 are shown in a flow chart form. Receiving portion 104 interprets the received data (280). Based on the result of interpretation, it is determined whether the received data is source equipment information by a destination notifying packet, or transferred contents data (282). If the data is source equipment information, transfer function specifying portion 102 stores the received source equipment information (source equipment information and contents data attribute information) (288). If the data is contents data, the contents data is stored in data receiving buffer 106 (284), and the received data is further processed in data receiving portion 108 (286). Thus, the input from the network interface is processed.

Figure 14:
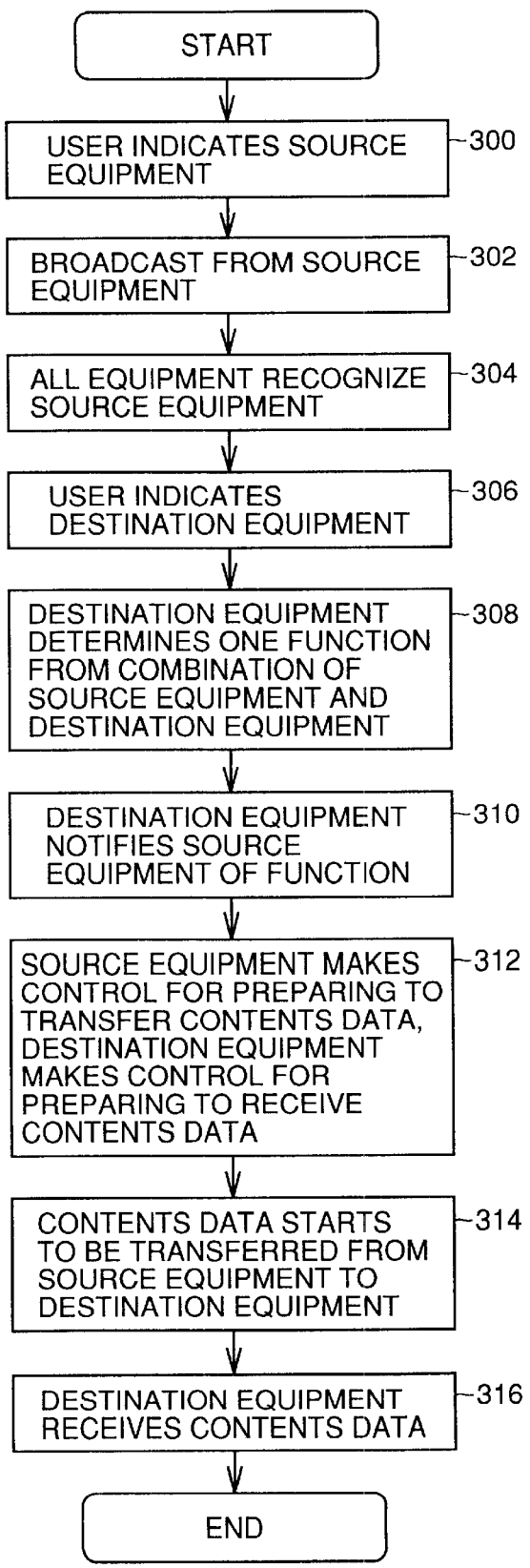
FIG. 14 is a flow chart for use in illustration of a processing sequence in the system according to the first embodiment.

Hereinafter, the procedure of operating the system will be now described. Referring to FIG. 14, the user indicates source equipment (300). The indication is processed by source specifying portion 64, using user interface 74 shown in FIG. 3 as described above.

Source specifying portion 64 broadcasts the source specifying information on the network as a destination notifying packet (302). All the equipment connected to the network receive and obtain the information, to identify the equipment specified as the source equipment (304). More specifically, as has been already described by referring to FIG. 4, transfer function specifying portion 102 stores the source equipment function information and contents data attribute information included in the received destination notifying packet.

Subsequently, the user specifies the destination equipment (306). The specifying of the destination equipment is processed by destination specifying portion 96 by operating user interface 100 provided at unit for destination equipment 56 as shown in FIG. 4.

Since the source equipment and destination equipment are thus determined, the destination equipment determines one data transfer function from the combination. The method of determination is as described by referring to FIGS. 11 and 12.

Then, the source equipment is notified of the function to execute the source equipment from the source equipment (310). The packet transmitted at this time is a transfer function completion response packet 172 shown in FIG. 9B.

The source equipment which has received transfer function completion response packet 172 makes a control for preparing to transfer contents data. Meanwhile, the destination equipment makes a control for preparing to receive contents data (312).

The contents data then starts to be transferred from the source equipment to the destination equipment (314). During the transfer, a transmission preparation completion notifying packet 174 (FIG. 9C) is sent from the source equipment to the destination equipment. Transmission preparation completion notifying packet 174 includes information 200 representing that the packet is a transmission preparation completion notifying packet, a source equipment identifier 202, and destination equipment identifier 204 as shown in FIG. 9C.

Meanwhile, the destination equipment executes a processing for receiving contents data (316). More specifically, as shown in FIG. 9D, a data transmission request packet 176 is transmitted from the source equipment to the destination equipment, and the source equipment transmits a packet including the contents data to the destination equipment in response to this packet. Referring to FIG. 9D, a data transmission request packet 176 includes information 210 indicating that the packet is a data transmission request packet, a source equipment identifier 212, and a destination equipment identifier 214.

Figure 15:
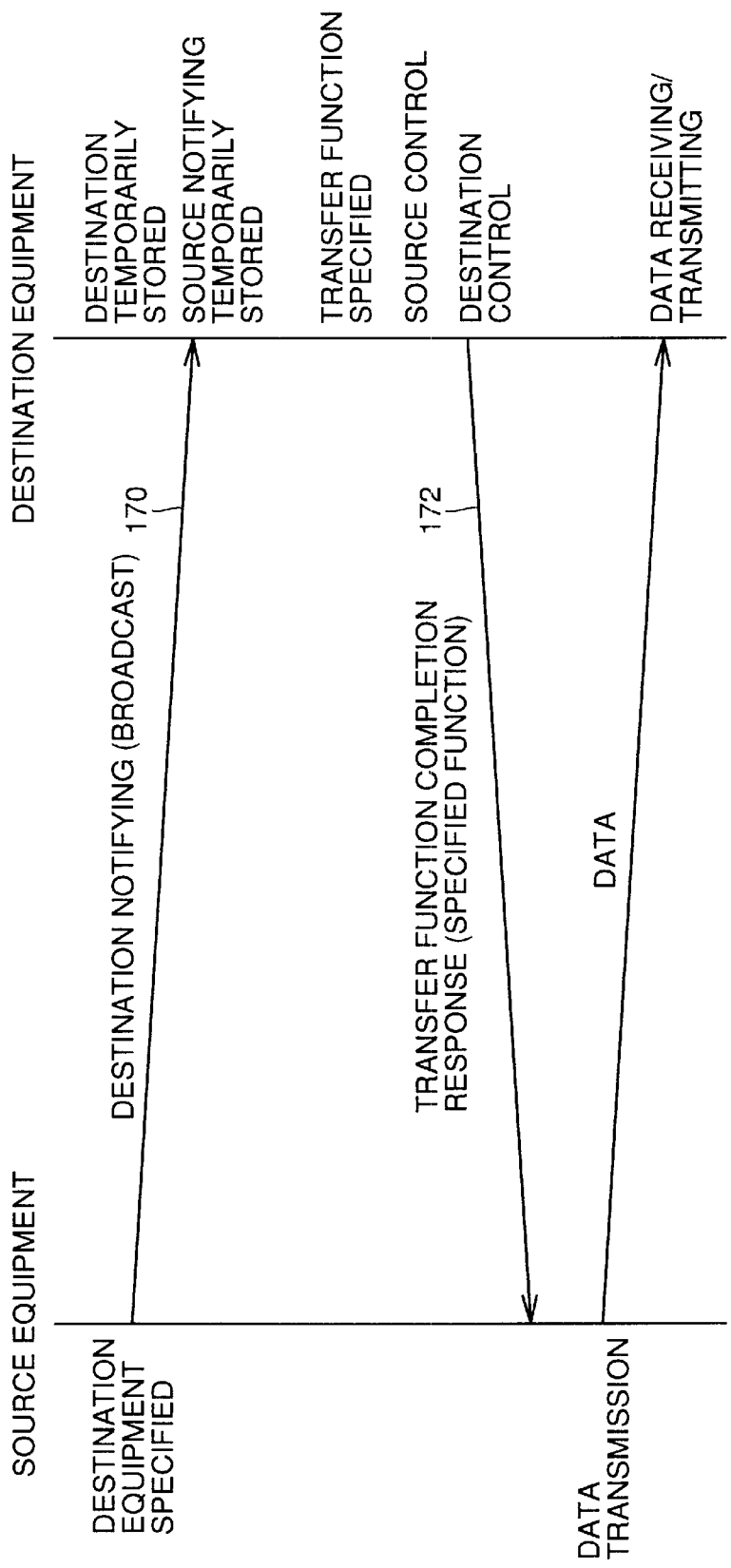
FIG. 15 is a sequence chart showing a processing sequence in the system according to the first embodiment.

Thus, the data transfer from the source equipment to the destination equipment is implemented. The processing sequence in the transfer method according to the above procedure is given in FIG. 15.

As described above, according to this embodiment, using user interface 74 provided at unit for source equipment 52, the source equipment is specified through physical interaction. Similarly, using user interface 100 provided at unit for source equipment 56, the destination equipment is specified through physical interaction. Therefore, the user does not have to be familiar with the correspondence between actual equipment and icons, unlike the case of using a virtual interface, for example, and the source and destination may be readily specified. By specifying the source and destination, a data transfer function corresponding to the combination is uniquely determined. The user therefore does not have to specify separate functions for the source and destination when data transfer is performed. Since, an appropriate data transfer function is selected and executed simply by specifying a source and a destination, a processing which requires equipment to operate in coordination with one another may be readily executed.

Second Embodiment

In the device according to the first embodiment, unit for source equipment 52 and unit for destination equipment 56 are provided, and source equipment and destination equipment are specified using user interface 74 and 100, respectively. By this method, the source equipment and destination equipment are physically specified, which advantageously permits the user to understand better about the specifying method rather than the method of using the virtual interface. However, specifying the source equipment and destination equipment, and specifying a data transfer function depending upon the combination of the specified source equipment and destination equipment, one characteristic of the present invention, is not limited to the above method of specifying the source equipment and destination equipment. In the system according to a second embodiment, one equipment specifying device is provided common to all equipment connected to a network, and destination equipment and source equipment are specified by this specifying device. One data transfer function is specified depending upon the combination of the source equipment and destination equipment thus specified, and the source equipment and destination equipment operate according to the data transfer function.

Figure 16:
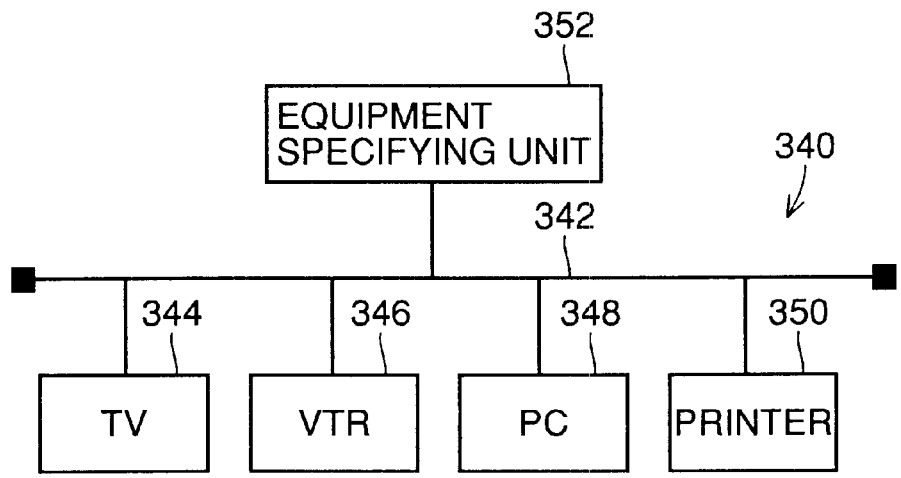
FIG. 16 is a block diagram of a system according to a second embodiment of the present invention.

Referring to FIG. 16, system 340 includes a network 342, and equipment including a TV 344, a video tape recorder 346, a PC 348, and a printer 350 connected to network 342, and equipment specifying device 352 having a user interface to specify source equipment and destination equipment.

Figure 17:
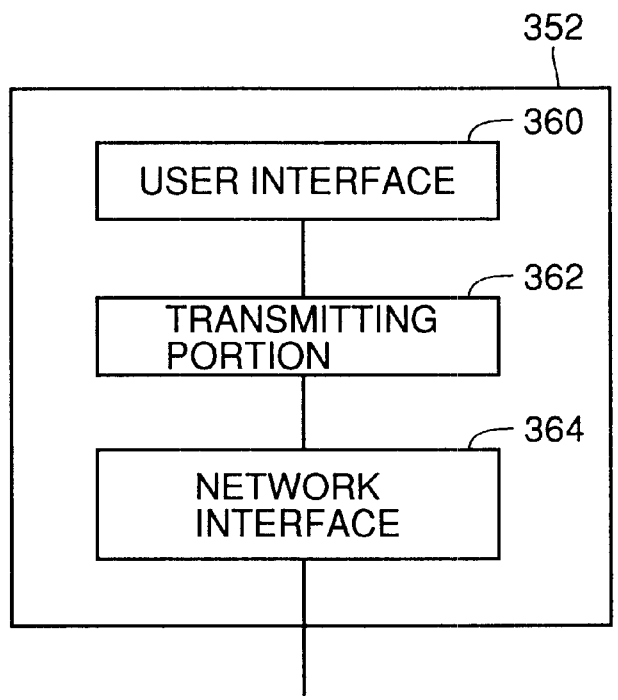
FIG. 17 is a block diagram of an equipment specifying unit according to the second embodiment.

Referring to FIG. 17, equipment specifying device 352 includes a user interface 360 for the user to specify source equipment and destination equipment, a transmitting portion 362 to transmit information on the source and destination thus specified, and a network interface 364 having information for mapping an equipment identifier to identify the specified equipment to a network identifier necessary for communication, used for adding appropriate information to the header at the time of transmitting/receiving a packet, and interpreting the header.

Figure 18:
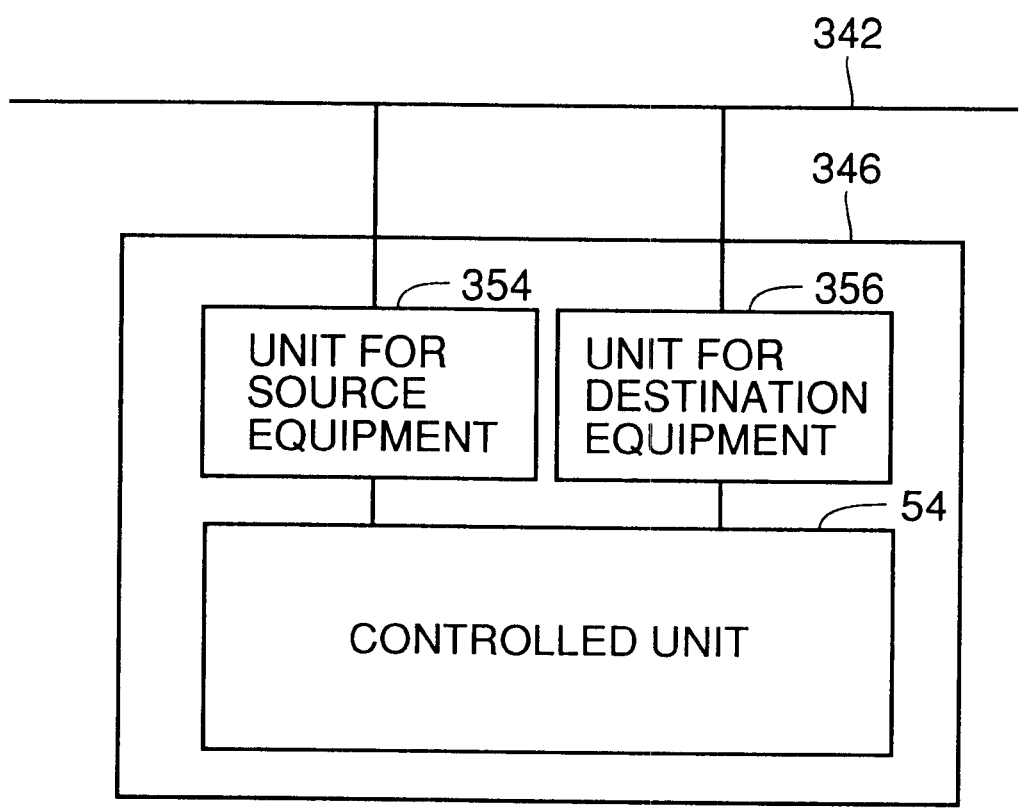
FIG. 18 is a block diagram of information equipment according to the second embodiment.

Referring to FIG. 18, video tape recorder 346, for example, includes a controlled equipment 54 as in FIG. 2, and a unit for source equipment 354 and a unit for destination equipment 356 unique to this system. In FIG. 18, both units 354 and 356 are provided because the video tape recorder may be used both as a destination and a source, but for any equipment used only as a unit for source equipment, unit for destination equipment 356 is not necessary. Among the components or units in the following embodiments and drawings, those the same as the components and units in the first embodiment are denoted by the same reference characters as those in the first embodiment. They have the same names and functions, and therefore the detailed description will not be repeated.

Figure 19:
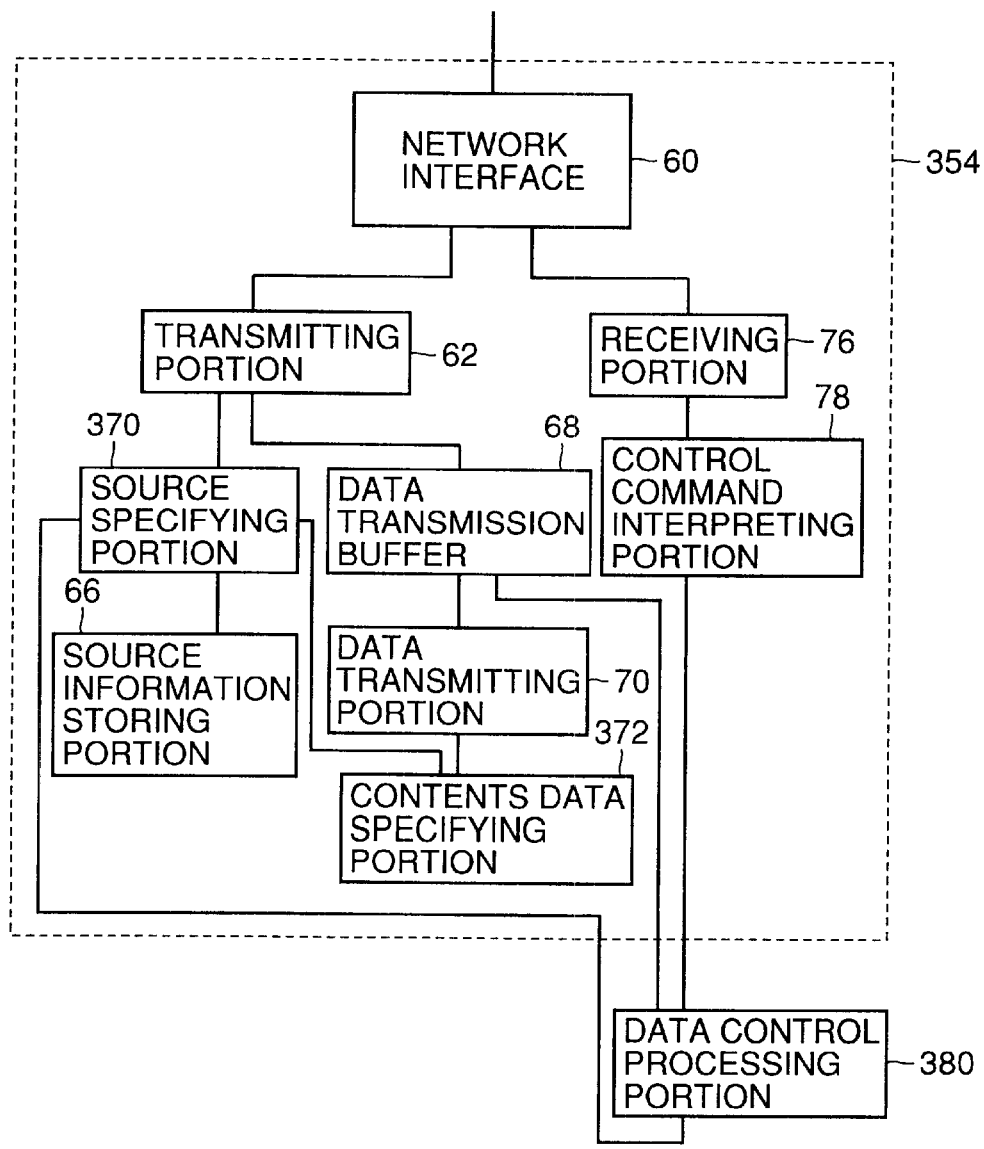
FIG. 19 is a block diagram of a unit for source equipment according to the second embodiment.

Referring to FIG. 19, unit for source equipment 354 is different from source equipment 52 according to the first embodiment shown in FIG. 3 in that equipment 354 does not have user interface 74, and that a destination equipment specifying portion 370 receives the output of a data control processing portion 380 provided in place of data control processing portion 80 in FIG. 3, not the output of user interface 74 in FIG. 3.

In operation, when a packet specifying source equipment is received from equipment specifying device 352, a control command interpreting portion 78 interprets that its equipment has been specified. Control command interpreting portion 78 further applies the information to data control processing portion 380, and notifies source equipment specifying portion 370 of that its equipment has been specified.

A contents data specifying portion 372 is different from contents data specifying portion 72 in FIG. 3 for its unique specifying processing without using user interface 74.

The other part and operations of equipment 354 in FIG. 19 are the same as those in FIG. 3 and therefore are not be detailed herein.

Figure 20:
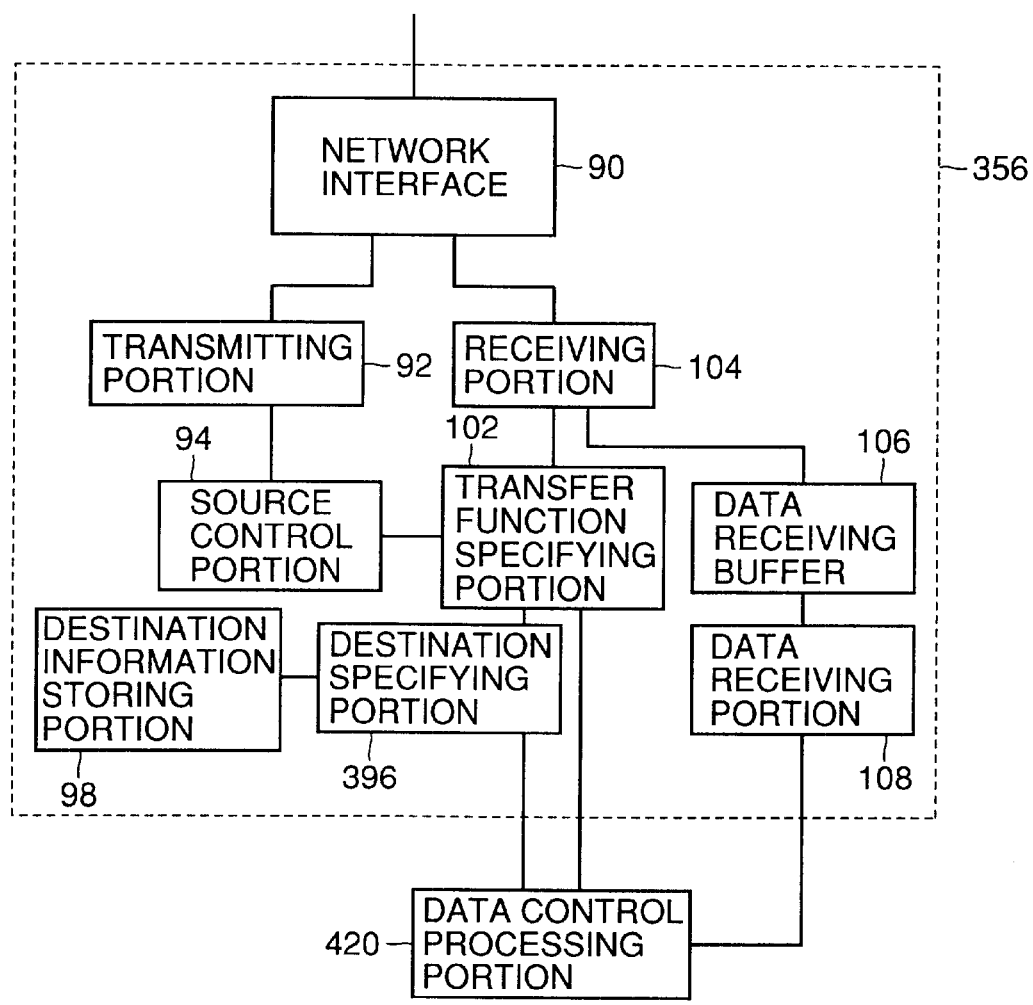
FIG. 20 is a block diagram of a unit for destination equipment according to the second embodiment.

Referring to FIG. 20, unit for destination equipment 356 used in the system according to the second embodiment is different from unit for destination equipment 56 shown in FIG. 4 according to the first embodiment in that it does not have user interface 100 shown in FIG. 4, and that it has a destination specifying portion 396 provided in place of destination specifying portion 96 shown in FIG. 4 for performing a destination equipment specifying processing based on information applied from data control processing portion 420 without receiving the input of a user interface.

In operation, when equipment including unit for destination equipment 356 is specified as a destination by equipment specifying device 352 shown in FIG. 16, a packet including the information is sent to unit for destination equipment 356. When receiving portion 104 receives the packet through network interface 90, transfer function specifying portion 102 interprets that its equipment has been specified as a destination. Transfer function specifying portion 102 further notifies destination specifying portion 396 of that its equipment has been specified as a destination. Destination specifying portion 396 performs the same processing as destination specifying portion 96 shown in FIG. 4 except that it is notified of that its equipment has been specified as a destination by transfer function specifying portion instead of a user interface.

Figure 21:
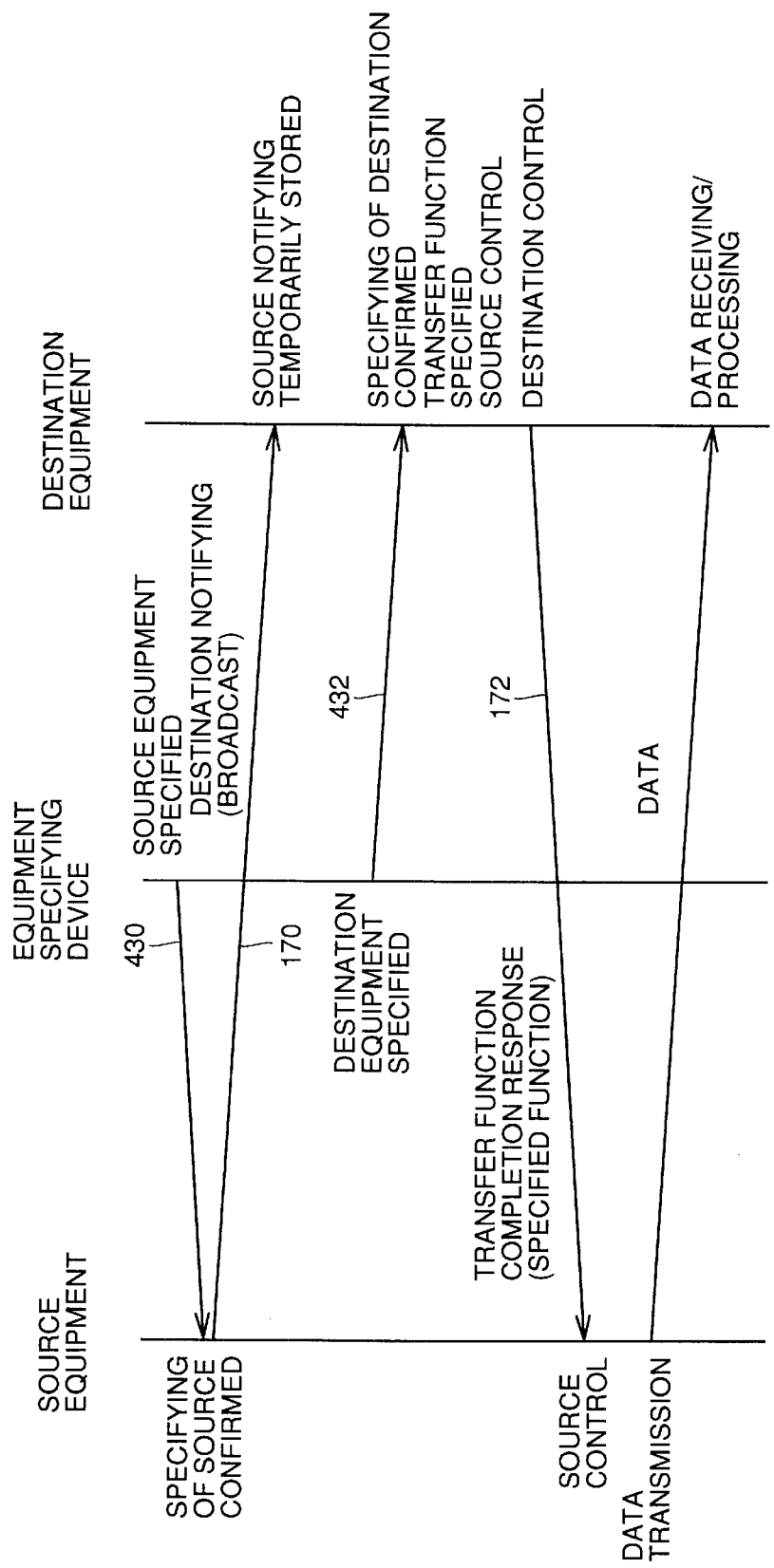
FIG. 21 is a sequence chart showing a processing sequence in the system according to the second embodiment.

FIG. 21 shows the processing sequence of the system according to the second embodiment. Referring to FIG. 21, the user specifies source equipment, using equipment specifying device 352. This data to specify the source equipment is sent to the source equipment as a packet 430. Unit for source equipment 354 in the source equipment confirms that its equipment has been specified as source equipment by the packet. The source equipment broadcasts a destination notifying packet. The broadcast destination notifying packet is temporarily stored by all the equipment. Subsequently, the user specifies the destination equipment, using equipment specifying device 352. The information indicating the specifying is applied to the source equipment as a packet 432. Unit for destination equipment 356 in the destination equipment receives the packet and confirms that its equipment has been specified as destination equipment. Thereafter, as is the case with the first embodiment, a data transfer function is specified, and processings to control the source equipment and destination equipment are performed. A transfer function completion response packet 172 including information to specify a function to be implemented by the source equipment is transmitted from the destination equipment to the source equipment. Thereafter, the source equipment performs processings necessary for data transmission and the destination equipment performs processings necessary for receiving and processing data, so that the data is transferred from the source equipment to the destination equipment.

In the system according to the second embodiment as described above, equipment specifying device 352 connected to the network and provided separately from the other equipment is used as a device for specifying source equipment and destination equipment. Since the source and destination are not specified through physical interaction as in the first embodiment, the problems associated with the use of the virtual interface still remain unsolved. However, once source equipment and destination equipment are specified, a data transfer function depending upon the combination of the equipment may be automatically specified and executed in this system according to the second embodiment. Therefore, separate commands to the equipment are not necessary. A processing which requires coordination among a plurality of pieces of equipment may be readily executed.

Third Embodiment

In the system according to the second embodiment, a device connected to a network is used as equipment specifying device. However, the device to specify equipment does not have to be connected to a network. A remote control device (hereinafter simply as "remote") common to a plurality of pieces of equipment, using optical communication may be utilized as an equipment specifying device. A system according to a third embodiment of the invention is such a system.

Figure 22:
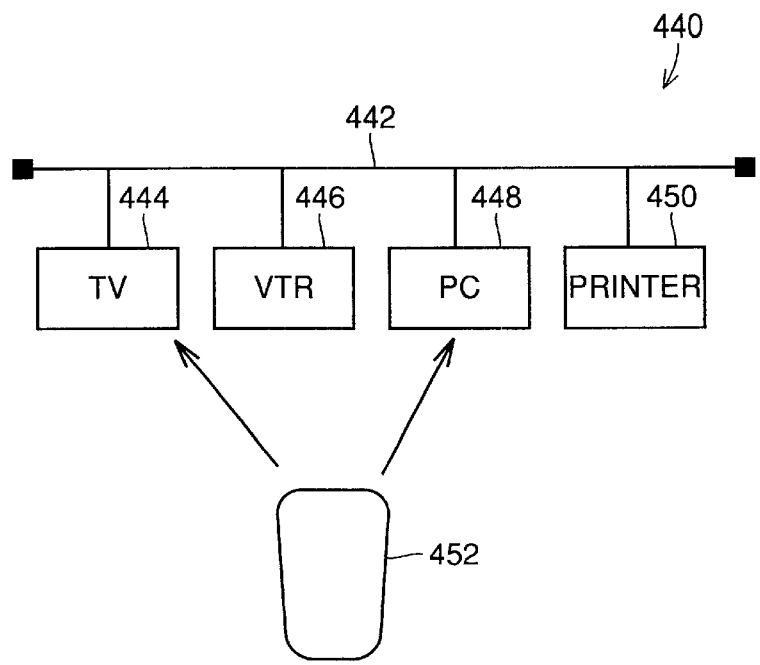
FIG. 22 is a block diagram of a system according to a third embodiment of the present invention.

Referring to FIG. 22, system 440 includes a network 442, and information equipment including in a TV 444, a video tape recorder 446, a PC 448, and a printer 450 connected to the network, and one remote 452 capable of separately operating these pieces of equipment 444, 446, 448 and 450. Note that remote 452 is common to these pieces of equipment in the third embodiment, but the present invention is not limited to the use of the common remote. For example, a single remote may be used only for one equipment or a common remote may be used only for some of the equipment. Alternatively, the equipment may be provided with a user interface similar to that described in connection with the first embodiment so as to specify equipment without using the remote.

Remote 452 shown in FIG. 22 is provided with a function to specify each equipment as source equipment or destination equipment in addition to a function to operate each equipment. These functions may be readily implemented by the functions to control each equipment. For example, a simple push button, or a button icon indicated on a display may be used. By directing the surface of the remote having the transmission device to equipment of interest and executing the function to specify destination equipment or source equipment, the equipment is specified by optical communication or physical interaction by electric waves. The operation of directing the remote in a prescribed direction itself may be regarded as a part of the physical interaction.

Figure 23:
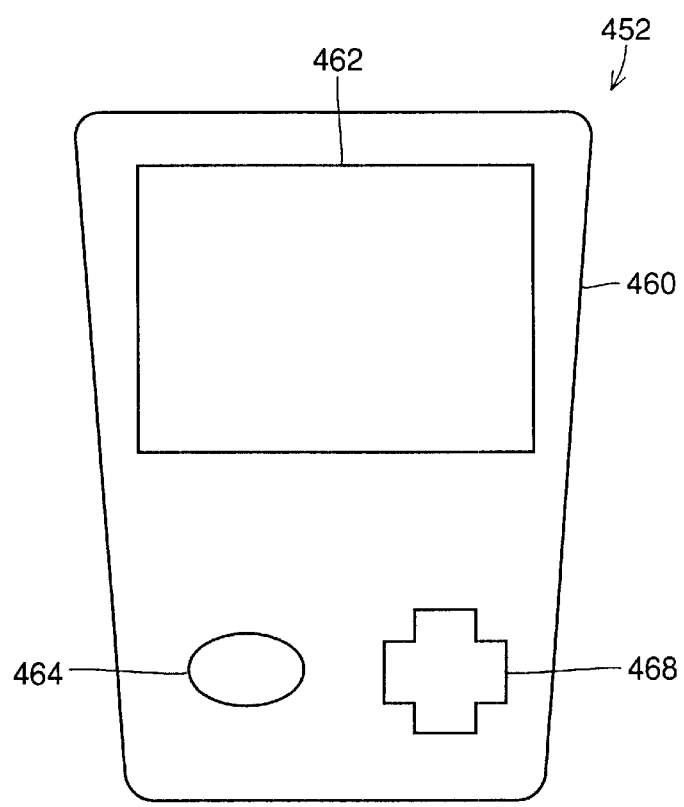
FIG. 23 is an overview of a remote control device according to the third embodiment.

FIG. 23 shows an overview of remote 452. Referring to FIG. 23, remote 452 includes a body case 460, a touch-panel type display 462 provided in the front of case 460, and a focus button 464 and a moving button 468 provided at case 460. Touch-panel type display 462 may display information to specify source equipment or destination equipment as described above to select, or may display contents data to be transferred to permit a range of the data to be specified. Focus button 464 is used for example to specify a magnification for display (i.e., a range of display) when the contents data is displayed in display 462. Moving button 468 is used to move the display range position in display 462.

In the system according to the third embodiment, source equipment and destination equipment are specified using remote 452. Remote 452 communicates separately with each equipment, and therefore one of the equipment is substantially physically specified in order to specify source equipment and destination equipment.

By remote 452, images of contents data which can be processed by source equipment are displayed on display 462, and the user may select a prescribed range of the images. The process is implemented by the user touching the touch panel or using buttons 464 and 468. Thus, the images of processible contents data or objects such as icons are displayed on display 462, and a desired object may be selected using button 464 or 468. At this time, if the contents data is an image, only a prescribed range of the image to be transferred may be specified. If the contents data is so-called multimedia data including an image, a sound, a text or the like, only a part of the data, for example, only the image, sound or text may be selected. An image to be displayed may be visually expanded or contracted. The use of remote 452 permits a resource such as data to be transferred from source equipment to be readily specified.

Also in this system, once source equipment and destination equipment are specified, one of data transfer functions appropriate for the combination is specified and automatically executed. Therefore, data transfer requiring coordination among a plurality of pieces of equipment may be readily performed. Also in this case, the remote is directed to equipment of interest and a prescribed operation is performed. Since the equipment is thus specified through such physical interaction, the operator may specify the equipment while always recognizing the equipment of interest.

Fourth Embodiment

A system according to a fourth embodiment of the present invention permits data transfer between information equipment, part of which is not connected to a network. Meanwhile, data transfer between equipment connected to a network is also permitted, and data transfer between equipment not connected to a network and equipment connected to the network is also permitted.

Figure 24:
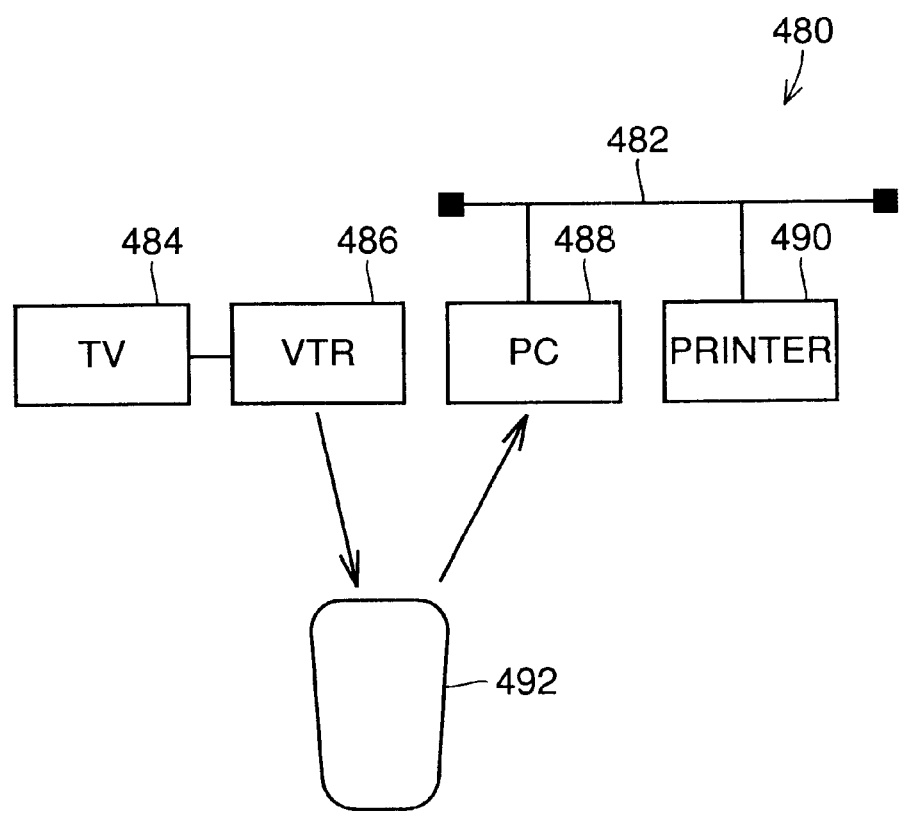
FIG. 24 is a block diagram of a system according to a fourth embodiment of the present invention.

Referring to FIG. 24, this system 480 includes a network 482, a PC 488 and a printer 490 connected to network 482, a TV 484 and a video tape recorder 486 not connected to network 482, and a remote 492 with a buffering function. TV 484 and video tape recorder 486 are connected with each other in a normal manner. In the following, video tape recorder 486 and PC 488 will be described by way of illustration.

Figure 25:
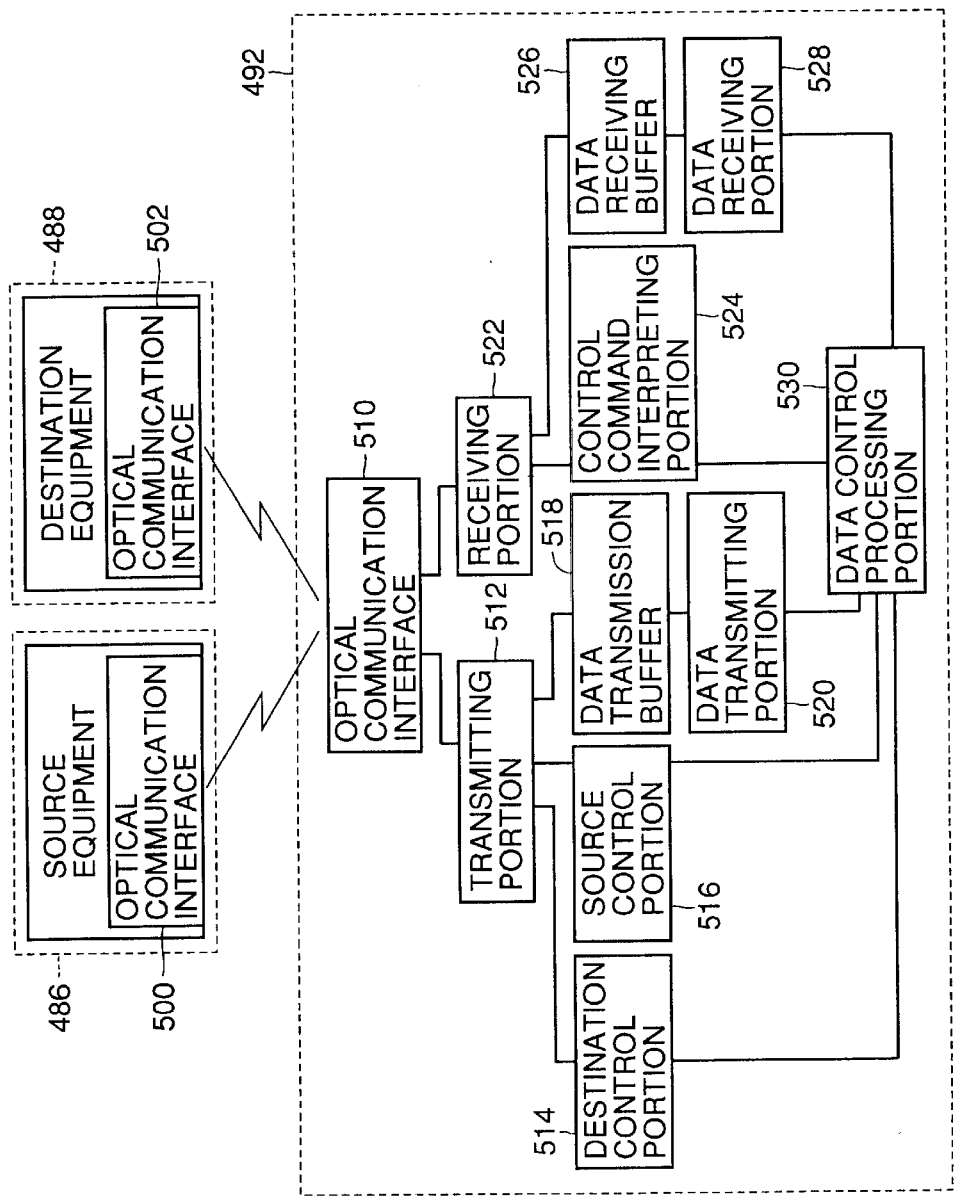
FIG. 25 is a block diagram of a remote control device used according to the fourth embodiment.

Referring to FIG. 25, video tape recorder 486 and PC 488 have optical communication interfaces 500 and 502, respectively. In the following description, it is assumed that video tape recorder 486 is source equipment and PC 488 is destination equipment.

Referring to FIG. 25, remote 492 includes an optical communication interface 510 capable of optical communication with interfaces 500 and 502, a transmitting portion 512 and a receiving portion 522 connected to optical communication interface 510, a destination control portion 514, source control portion 516, and a data transmission buffer 518 all connected to transmitting portion 512, a data transmitting portion 520 connected to data transmission buffer 518, a control command interpreting portion 524 and a data receiving buffer 526 both connected to receiving portion 522, a data receiving portion 528 connected to data receiving buffer 526, and a data control processing portion 530 connected to destination control portion 514, source control portion 516, data transmitting portion 520, control command interpreting portion 524, and data receiving portion 528. Remote 492 with the buffering function functions to temporarily store data transferred from source equipment 486 in data receiving buffer 526, and enables data transfer between source equipment 486 and destination equipment 488 by transmitting the data to destination equipment 488. This remote functions to specify equipment through physical interaction, as is the case with the remote used according to the third embodiment.

Control command interpreting portion 524 interprets a control command received through optical interface 510 and receiving portion 522, and applies the result of interpretation to data control processing portion 530. Data receiving buffer 526 is used to temporarily store data received from source equipment 486 through optical communication interface 510 and receiving portion 522. Data receiving portion 528 is used to process data stored in data receiving buffer 526.

Data control processing portion 530 provides an instruction to source control portion 514 and destination control portion 516 in response to a control command applied from control command interpreting portion 524. Data control processing portion 530 also applies data received by data receiving portion 528 to data transmitting portion 520, and performs processings necessary for transmission to destination equipment 488 through data transmission buffer 518, transmitting portion 512, and optical communication interface 510.

Destination control portion 514 and source control portion 516 apply information for controlling destination equipment 488 and source equipment 486, respectively to destination equipment 488 and source equipment 486 through optical communication interface 510 in response to an instruction provided from data control processing portion 530. Optical communication interface 510 can communicate with both optical communication interface 500 and optical communication interface 502, but only with one at a time.

Figure 26:
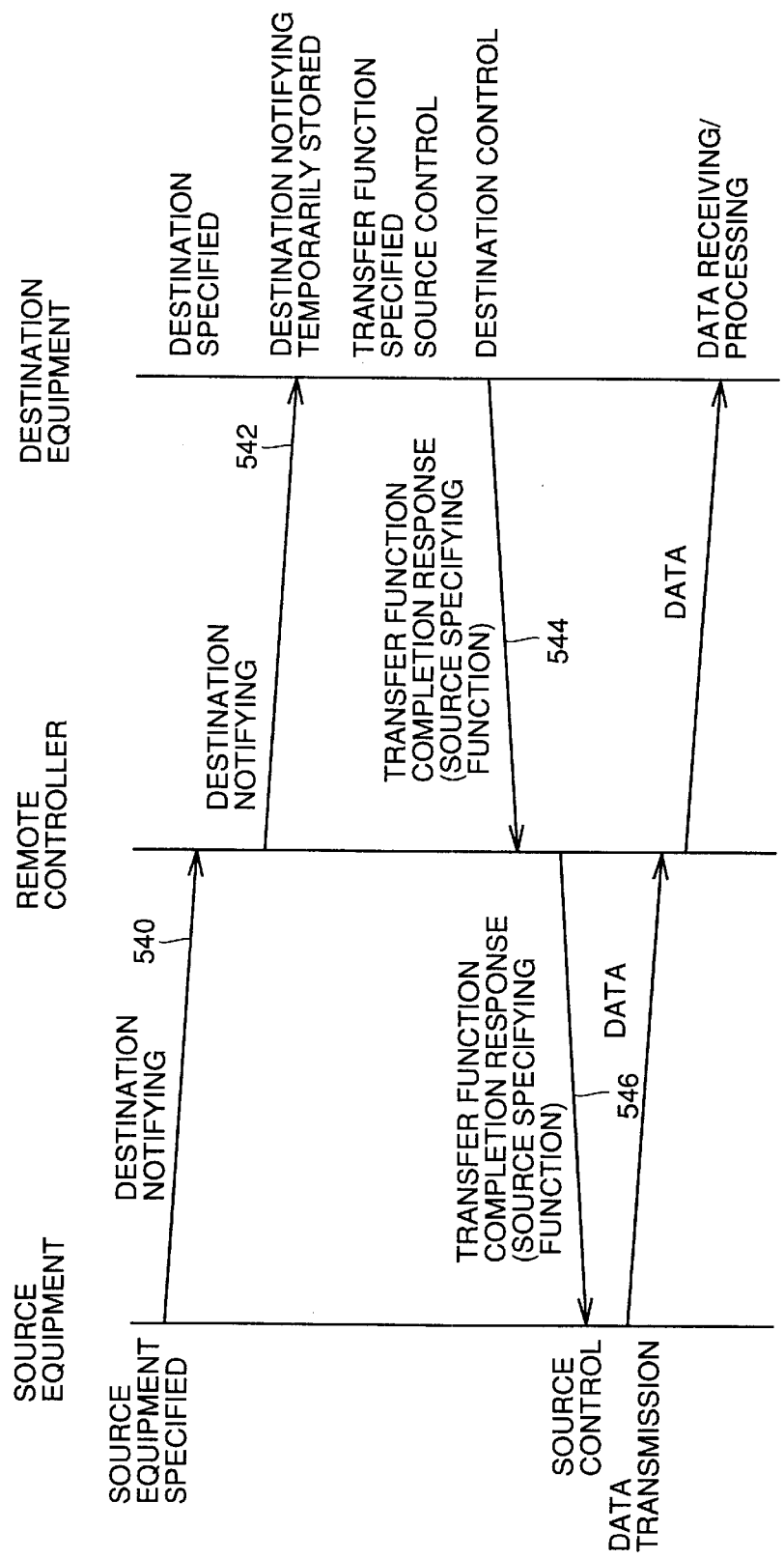
FIG. 26 is a sequence chart showing an operation sequence in the system according to the fourth embodiment.

FIG. 26 shows a processing sequence of the system according to the fourth embodiment. Referring to FIG. 26, remote 492 (a buffering device) of this system operates as follows. Source equipment is specified according to the method as in the first embodiment. The source equipment responds to the specifying to apply a destination equipment notifying packet 540 to remote 492. Remote 492 interprets this destination equipment notifying packet and transfers the result of interpretation as a destination equipment notifying packet 542 to destination equipment 488 through destination equipment control portion 514, transmitting portion 512, and optical communication interface 510. Prior to this process, in destination equipment 488, destination equipment has been specified in the same manner as in the first embodiment. The destination equipment temporarily stores the source equipment information included in the destination equipment notifying packet thus applied. The destination equipment further specifies a data transfer function according to the method as described above based on the combination of the source equipment information and the equipment information of itself. A processing to control the source equipment based on the specified data transfer function is executed, and a transfer function completion response packet 544 including information to specify a function to be implemented by the source equipment is applied to remote 492. The destination equipment makes a control according to a function to be implemented by itself (the destination equipment) based on the specified data transfer function.

Remote 492 which has received transfer function completion response packet 544 applies a transfer function completion response packet 546 to source equipment 486 through source control portion 516, transmitting portion 512, and optical communication interface 510.

Source equipment 486 controls itself according to the processing to specify the function of the source equipment included in transfer function completion response packet 546, thus received. More specifically, the source equipment transmits data to remote 492.

As described above, remote 492 temporarily stores the data in data receiving buffer 526. Thereafter, remote 492 and destination equipment 488 are allowed to communicate such that the data stored in remote 492 is transmitted to destination equipment 488. Destination equipment 488 receives the data and performs a necessary processing to the data.

As in the foregoing, in the system according to the fourth embodiment, remote 492 with the buffering function is inserted between source equipment and destination equipment not directly connected by a network, so that data transfer between the source equipment and destination equipment may be performed. If necessary, the process as described above including the data transmission, the data storing to remote 492, and the transmission to the destination equipment may be repeated a necessary number of times to permit transfer of large volume data. If data is small, the contents data may be entirely stored in remote 492 and simple data transfer is achieved. Further in this case, the operation of specifying equipment by the remote is performed through physical interaction between the remote and the equipment of interest. Therefore, the user may specify equipment while recognizing the equipment of interest.

In this embodiment, the processing to specify the transfer function is performed by destination equipment 488 as is the case with the first embodiment, but the invention is not limited to this, and such a function may be provided for example in remote 492.

Fifth Embodiment

In the foregoing embodiments, each equipment connected to a network is assumed to have a single function. However, in practice, there exist various equipment having a plurality of independently functioning sub elements such as a stereo including equipment such as a CD player, a record player, a cassette tape player, and a tuner. In a system including such equipment, if source equipment or destination equipment is specified as a stereo, which one of the sub elements in the stereo will be used cannot be specified. In a system according to a fifth embodiment, in the case of such equipment including sub elements, an appropriate data transfer function as described above is specified by specifying equipment to the level of the sub elements. In a device according to the fifth embodiment, if a plurality of data transfer functions are determined to be appropriate depending on the combination of sub elements, a priority is set according to a predetermined priority determining rule unlike the system according to the first embodiment, and a combination with the highest priority is employed. Thus, the user intervention is reduced, and yet an appropriate data transfer function may be easily executed. Note however that determining one function using the priority determining rule and selecting one function by the user are equivalent and the function may be selected by any of these methods.

Figure 27:
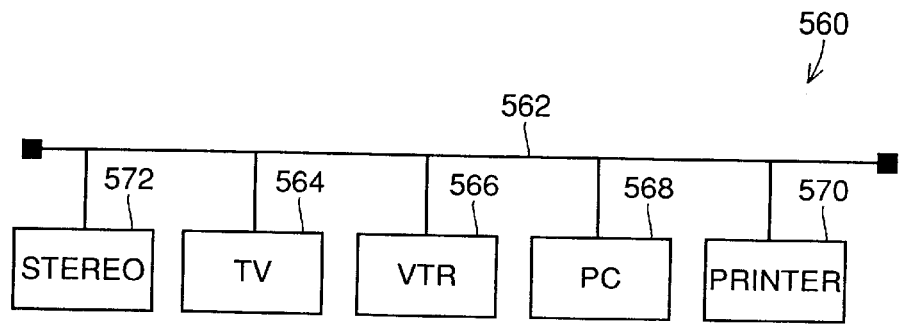
FIG. 27 is a block diagram of a system according to a fifth embodiment of the present invention.

Referring to FIG. 27, this system 560 includes a network 562, and a stereo 572, a TV 564, a video tape recorder 566, a PC 568, and a printer 570 connected to network 562. Among the equipment shown in FIG. 27, stereo 572 and PC 568 include sub elements. In the following, stereo 572 will be described by way of illustration.

Figure 28:
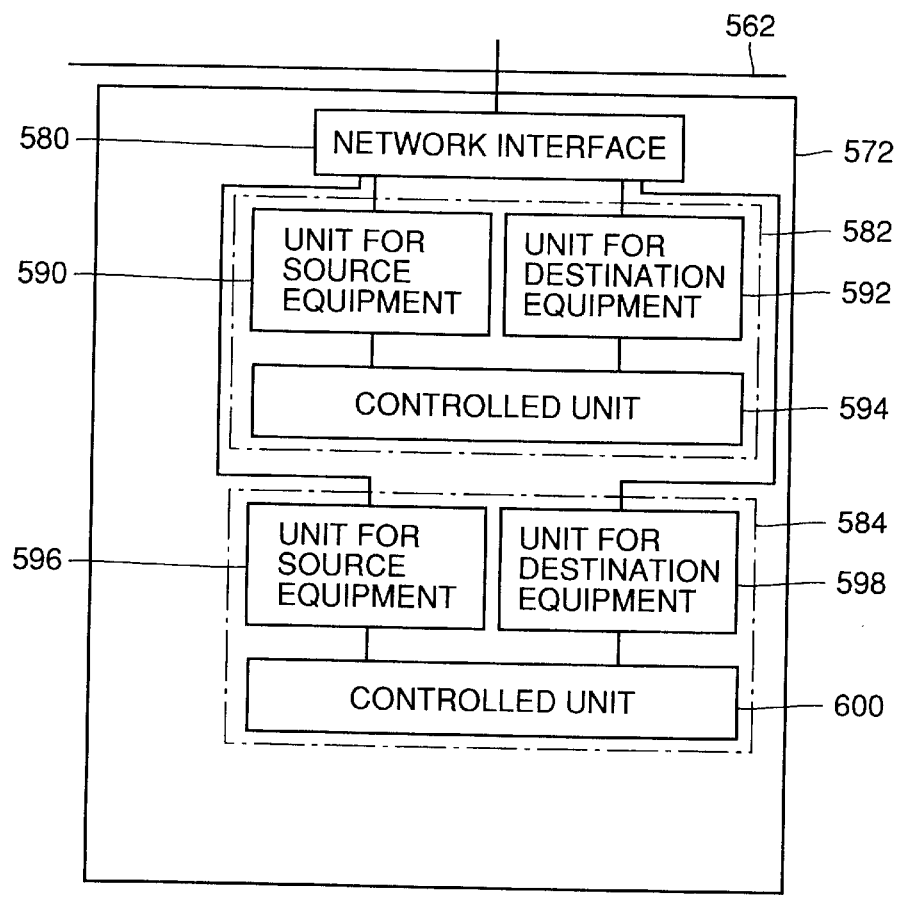
FIG. 28 is a block diagram of information equipment according to the fifth embodiment.

Referring to FIG. 28, stereo 572 includes a network interface 580, and a plurality of sub elements 582 and 584. In FIG. 28, only these two are shown as sub elements, but it is understood that three ore more sub * elements may be included.

Sub element 582 includes controlled equipment 594, a unit for source equipment 590 and a unit for destination equipment 592 both connected between network interface 580 and controlled equipment 594. Sub element 584 similarly includes controlled equipment 600, a unit for source equipment 596, and a unit for destination equipment 598. Sub elements 582 and 584 have the same configuration except for the controlled equipment included, and therefore only sub element 582 will be described.

Figure 29:
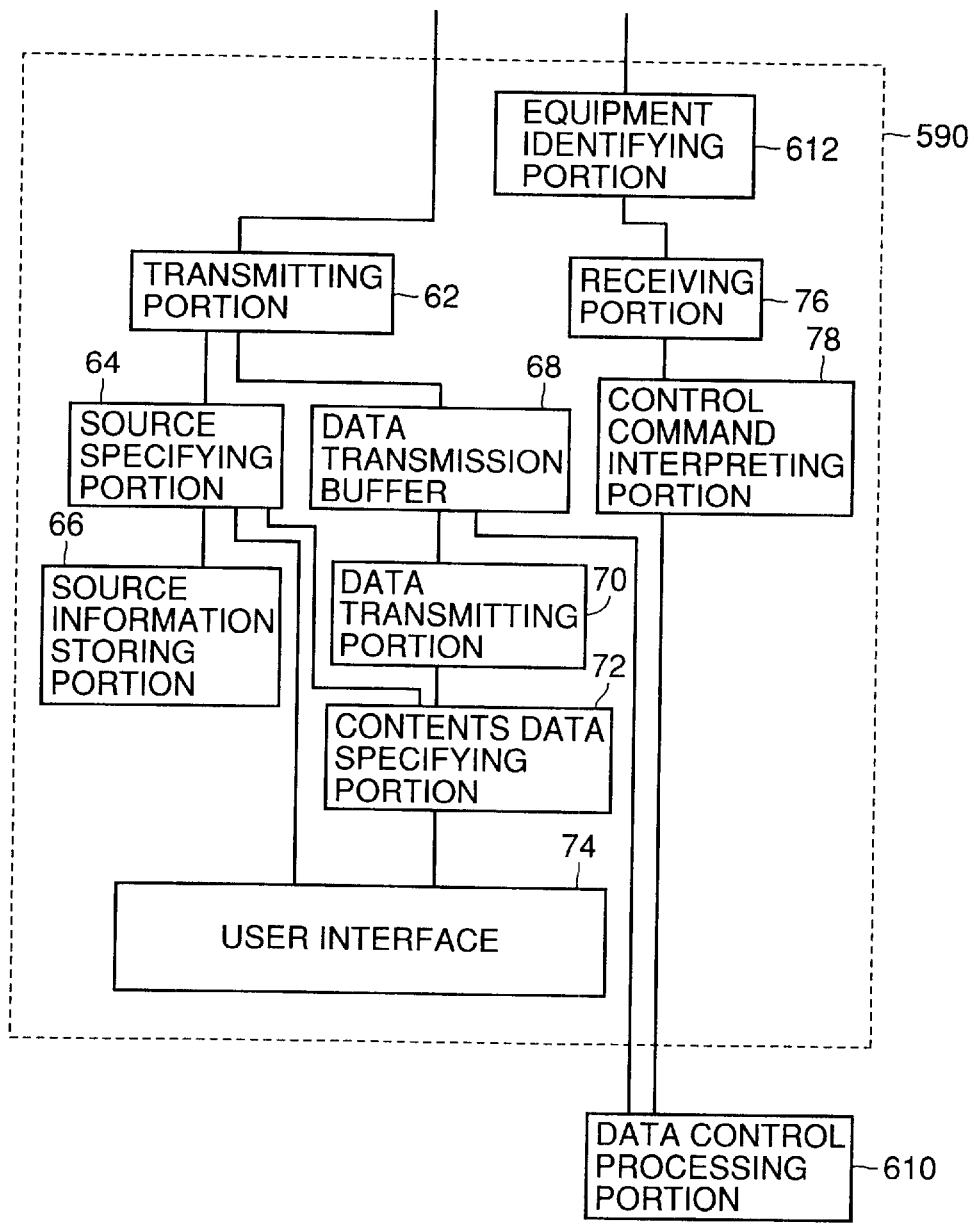
FIG. 29 is a block diagram of an unit for source equipment used according to the fifth embodiment.
Figure 30:
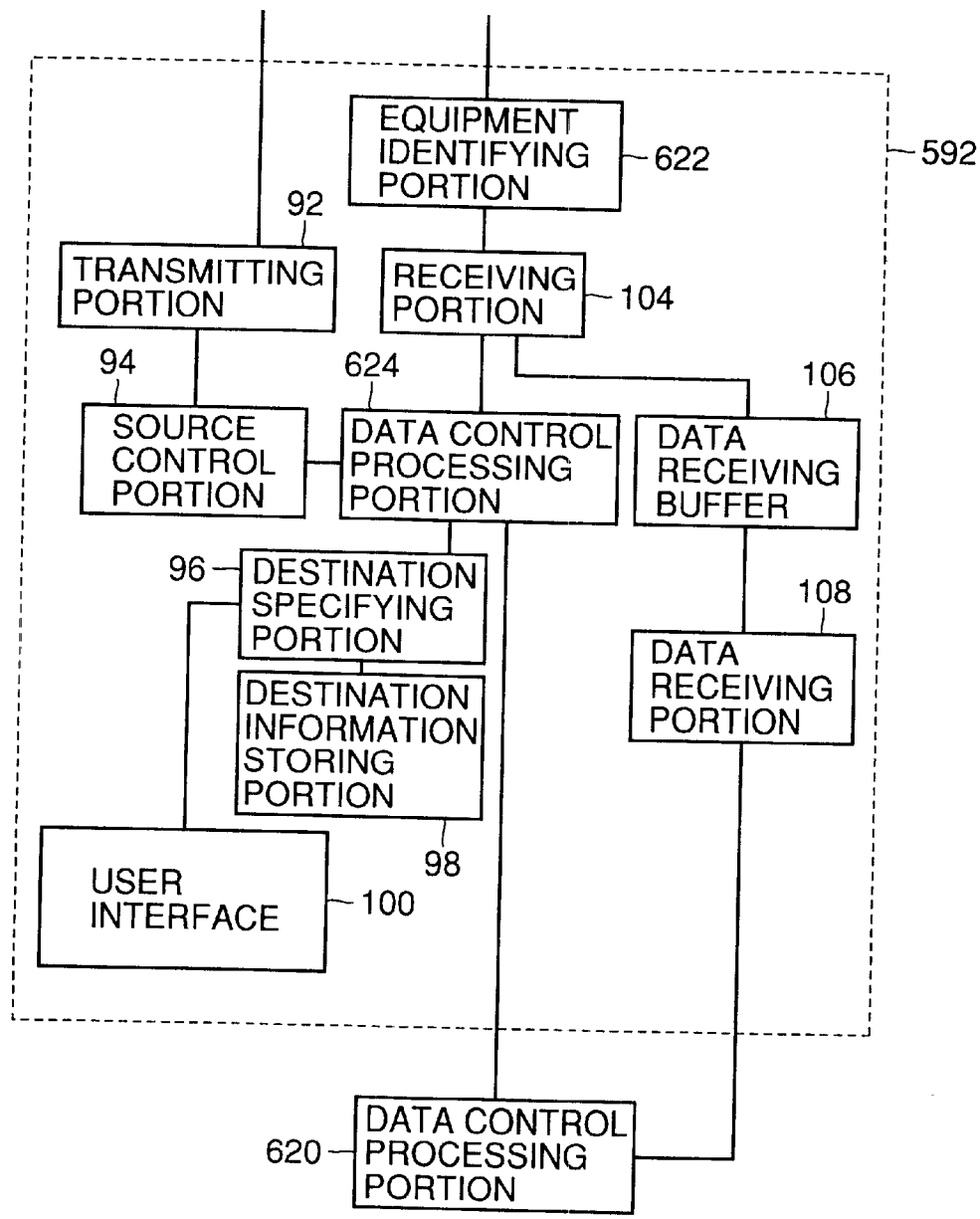
FIG. 30 is a block diagram of an unit for destination equipment used according to the fifth embodiment.

Referring to FIG. 29, unit for source equipment 590 in sub element 582 is different from unit for source equipment 52 in the first embodiment in that equipment 590 does not have network interface 60 shown in FIG. 4, that transmitting portion 92 is connected to a common network interface 580, and that there is provided between network interface 580 and receiving portion 104 an equipment identifying portion 622 functioning similarly to equipment identifying portion 612 shown in FIG. 29. A data control processing portion 620 shown in FIG. 30 is the same as data control processing portion 120 shown in FIG. 4, except that data control processing portion 620 is used to control the controlled equipment of the sub element. A transfer function specifying portion 624 determines a priority according to a prescribed priority determining rule when a plurality of data transfer functions are extracted, and selects a combination with the highest priority, unlike transfer function specifying portion 102 shown in FIG. 4. The process executed by transfer function specifying portion 624 will be now described.

Referring to FIG. 30, a unit for destination transfer equipment 592 in sub element 582 is different from unit for destination equipment 56 in the system according to the first embodiment in that equipment 592 does not have network interface 90, and its transmitting portion 92 is connected to a common network interface 580, and that an equipment identifying portion 622 functioning similarly to equipment identifying portion 612 shown in FIG. 29 is provided between network interface 580 and receiving portion 104. A data control processing portion 620 shown in FIG. 30 is the same as data control processing portion 120 in FIG. 4 except that it is used to control controlled equipment in a sub element. A transfer function specifying portion 624 determines priorities according to a prescribed priority determining rule for a plurality of data transfer functions extracted, and selects a combination of functions with the highest priority, unlike transfer function specifying portion 102 shown in FIG. 4. The processings executed by transfer function specifying portion 624 will be now described.

Figure 31:
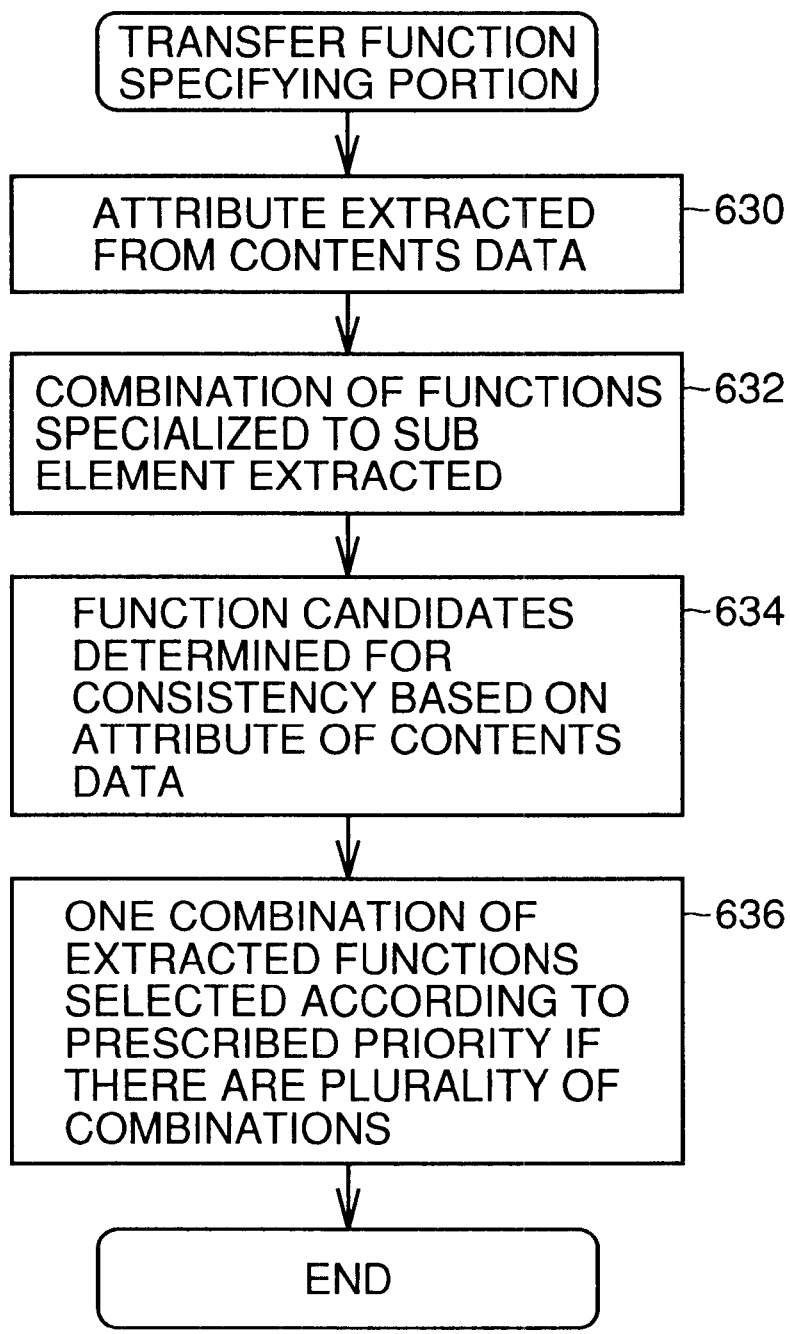
FIG. 31 is a flow chart for use in illustration of a processing executed by a transfer function specifying portion in the unit for destination equipment according to the fifth embodiment.

Referring to FIG. 31, transfer function specifying portion 624 extracts an attribute from contents data in source equipment information included in a source notifying packet received through receiving portion 104 (630). A combination of functions specific to sub element 582 are extracted (632). About the extracted function candidates, the attribute of the contents data and the attribute of each function are determined for consistency similarly to the first embodiment, and only anything consistent is extracted (634). If there are a plurality of combinations of functions thus extracted, one function is selected according to the prescribed priority determining rule (636). Information indicating the selected data transfer function is applied to source control portion 94, and transmitted to the source equipment or a sub element in the source equipment.

The rule to determine the priority is previously stored in transfer function specifying portion 624. As the rule to determine the priority, any rule which can be transformed into a certain algorithm is employed. For example, applying higher priorities to functions which enable higher transfer rates of contents data or to data with higher resolutions may be employed.

Assume that source equipment is for example a TV and destination equipment is a video tape recorder. Information extracted from the equipment correspondence table is "function=line output, attribute=image data" for the source equipment, while what is extracted for the destination equipment is "function 1=recording, attribute 1=image data, function 2=recording, attribute 2=sound data". Since there are two kinds of functions, function 1 and function 2 as the function of the destination equipment, there will be two combinations for the functions of the source equipment and destination equipment. In this case, if image data is provided with a higher priority than sound data, only "function=recording, attribute=image data" will be extracted as the function of the destination equipment. Therefore, the combination of the functions of the source equipment and destination equipment may be uniquely determined.

Note that the priority determining rule is pre-stored in unit for destination equipment 592 in a machine-readable form. The information may be defined by the user or vendor, or the information may be stored in a prescribed location in the network, so that it may be read into the equipment as desired.

In the system according to the fifth embodiment, if the pieces of equipment forming the system consist of a plurality of sub elements, the combination of the functions of the source equipment and destination equipment may be uniquely specified. As an identifier used by equipment identifying portion 612 or 622, a combination of an identifier representing the entire equipment of interest and an identifier to identify a sub element may be used. For example, if equipment of interest is a stereo, S is used as the identifier of the equipment, and if the sub element desired to be specified as destination equipment is a speaker, P is used as the identifier of the speaker, and the identifier of the speaker is SP in the system. Thus, each equipment may be uniquely specified on the network, and each sub element in each equipment may be uniquely specified as well.

Note that in order to determine any combination with a higher priority among combinations of a plurality of pieces of equipment as described above, it is effective to prepare a tree structure functional table. In order to express each function in a tree structure, categories based on the characteristics of functions such as output/input and digital/analog are previously defined. The consistency of the functions in each level up to a specified level (1 to n) is determined.

Referring to FIG. 7, for example, if source equipment is a video tape recorder, and destination equipment is a TV, the function information of the video tape recorder is "function level 1=reproduction, function level 2=normal reproduction, function level 2=double-speed reproduction", while the function information of the TV, the destination equipment is "function level 1=line input, function level 2=entire picture plane display, function level 2=small picture plane display".

Based on the function correspondence table, if the source equipment is a video tape recorder and the destination equipment is a TV, the combination of reproduction for the source function and line input for the destination function is extracted. When an algorithm to specify a transfer function is applied to the functional table in FIG. 7 for the combination, the normal reproduction and double-speed reproduction are extracted as function level 2 and the small picture plane display and entire picture plane display are extracted for the TV. Thus, a combination cannot be uniquely specified in this state.

Therefore, a rule to treat the double-speed reproducing with a higher priority than the normal reproducing is provided for the reproducing function, and a priority determining rule to treat the small picture plane display with a higher priority than the entire picture display is provided for the display function. Then, only the combination of functions with higher priorities is extracted, and as a result, the double-speed reproducing is executed in the video tape recorder and the reproduced image is displayed in the small picture plane on the TV.

As described above, categorizing the functions of the equipment in the tree structure as shown in FIGS. 6 and 7, the data transfer function may be appropriately determined based on the detailed functions and attribute of each equipment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of transferring data in a system including a plurality of pieces of equipment capable of transferring data with each other, comprising the steps of:
   preparing information in a machine-readable form to specify a data transfer function corresponding to a combination of source equipment and destination equipment;
   specifying source equipment through physical interaction with the source equipment;
   specifying destination equipment through physical interaction with the destination equipment; and
   operating said source equipment and said destination equipment to utilize control circuitry associated therewith to uniquely determine the data transfer function based on information related to the specified source equipment, said information in a machine readable form including information to specify said data transfer function and to automatically execute transmission.

2. The method as recited in claim 1, wherein
   the source equipment or destination equipment includes a plurality of sub elements each functioning separately from one another,
   said preparing step includes preparing information to specify a data transfer function corresponding to a possible combination of said sub element in said source equipment and a sub element in the destination equipment in a machine-readable form,
   said step of specifying said source equipment includes specifying one of sub elements in said source equipment through physical interaction with the sub element,
   said step of specifying said destination equipment includes specifying one of the sub elements in said destination equipment through physical interaction with the sub element,
   said step of operating said source equipment and destination equipment includes uniquely determining a data transfer function based on information on the sub element in said specified source, information on the sub element in the specified destination, and information to specify said data transfer function, thereby operating the sub element in said source equipment and the sub element in said destination equipment to uniquely determine the data transfer function and automatically execute transmission.

3. The method as recited in claim 2, wherein
   said step of operating the sub element in said source equipment and the sub element in said destination equipment includes the steps of:
   extracting a data transfer function based on information on the sub element in the specified source equipment, information on the sub element in the specified destination equipment, and information to specify said data transfer function;
   when a plurality of data transfer functions are extracted, selecting one of said plurality of data transfer functions according to a predetermined determining method; and
   operating the sub element in said source equipment and the sub element in said destination equipment to automatically execute transmission according to said selected data transfer function.

4. The method as recited in claim 1, wherein
   said step of operating said source equipment and said destination equipment includes the steps of:
   extracting a data transfer function based on information related to the specified source equipment, information on the specified destination equipment, and information to specify said data transfer function;
   when a plurality of data transfer functions are extracted, selecting one of said plurality of data transfer functions according to a predetermined determining method; and
   operating said source equipment and said destination equipment to automatically execute transmission according to said selected data transfer function.

5. The method as recited in claim 4, wherein
   said step of selecting one of said data transfer functions includes indicating the extracted plurality of data transfer functions to the user and allowing the user to select one data transfer function.

6. The method as recited in claim 3, wherein
   said step of selecting one of said data transfer functions includes indicating the extracted plurality of data transfer functions to the user and allowing the user to select one data transfer function.

7. The method as recited in claim 3, wherein said step of selecting one of said data transfer functions includes determining the priorities of said extracted plurality of data transfer functions according to a predetermined priority determining rule, thereby selecting a data transfer function with the highest priority.

8. The method as recited in claim 4, wherein said step of selecting one of said data transfer functions includes determining the priorities of said extracted plurality of data transfer functions according to a predetermined priority determining rule, thereby selecting a data transfer function with the highest priority.

9. The method as recited in claim 1, further comprising:

extracting contents data which can be transferred in response to specifying of a source equipment; and when a plurality of pieces of contents data are selected, selecting one of the plurality of pieces of contents data as transmission data to the destination according to a predetermined determining method.

10. The method as recited in claim 9, wherein said step of selecting one of the plurality of pieces of contents data as the transmission data to said destination includes indicating the extracted contents data which can be extracted to the user, thereby allowing the user to select one contents data.

11. A data transfer system, comprising:

a network;

a plurality of pieces of equipment connected to said network;

a source equipment specifying circuit for specifying source equipment through physical interaction with said source equipment;

a destination equipment specifying circuit for specifying destination equipment through physical interaction with said destination equipment; and processing circuitry for uniquely determining and executing a data transfer function based on a combination of the specified source equipment and the specified destination equipment.

12. The system as recited in claim 11, wherein said source equipment specifying circuit for specifying source equipment is provided for each equipment which can be a source, and said destination equipment specifying circuit for specifying destination equipment is provided for each equipment which can be a destination.

13. The system as recited in claim 11, further comprising a separate remote control device not connected to said network, said remote control device being capable of communicating separately with said plurality of pieces of equipment, and said remote control device including said circuit for specifying source equipment and said circuit for specifying destination equipment.

14. A data transfer system, comprising:

a network;

a plurality of pieces of equipment connected to said network;

a source equipment specifying circuit for specifying source equipment through physical interaction with said source equipment;

a destination equipment circuit specifying for specifying destination equipment through physical interaction with said destination equipment; and processing circuitry for uniquely determining and executing a data transfer function based on a combination of the specified source equipment and the specified destination equipment, the source equipment or/and destination equipment including a plurality of sub elements each implementing a separate function, said circuit for specifying source equipment includes circuitry for specifying one sub element in said source equipment through physical interaction with the sub element, said circuit for specifying destination equipment includes circuitry for specifying a sub element in said destination equipment through physical interaction with the sub element, said processing circuitry for uniquely determining and executing a data transfer function being operable for operating the sub element in said source equipment and the sub element in the destination equipment to uniquely determine a data transfer function based on information on the specified sub element in the source equipment, information on the specified sub element in the destination equipment and information to specify said data transfer function, and to automatically execute transmission.

15. The system as recited in claim 11, wherein said processing circuitry for uniquely determining and executing a data transfer function includes:

means for storing a table of data transfer functions corresponding to combinations of source equipment information and destination equipment information;

means for uniquely specifying a data transfer function based on the source information and destination information by referring to the table; and means for controlling the source equipment and destination equipment based on the uniquely specified data transfer function.

16. The system as recited in claim 15, wherein the source information and destination information each have a tree structure formed by classifying the functions of corresponding equipment into categories, each category in said tree structure is associated with a prescribed attribute, and said processing circuitry for uniquely specifying said data transfer function includes means for extracting only a combination of functions having their attributes consistent with each other.

17. The system as recited in claim 11, wherein said processing circuitry for uniquely determining and executing a data transfer function is provided in the destination equipment.

18. The system as recited in claim 11, wherein said processing circuitry for uniquely determining and executing a data transfer function is a unit independent from said plurality of pieces of equipment connected to the network.

19. The system as recited in claim 14, wherein said processing circuitry for operating the sub element in said source and the sub element in said destination includes:

means for extracting a data transfer function based on information on the specified source equipment, information on the specified destination equipment, and information to specify said data transfer function;

means for selecting one data transfer function according to a predetermined determining method when a plurality of data transfer functions are extracted; and means for operating said source equipment and said destination equipment to automatically execute transmission according to said selected data transfer function.

20. A transfer equipment specifying device for controlling data transfers over a network between source equipment and destination equipment other than the transfer equipment specifying device, comprising:

receiving circuitry connected to a network for receiving data source information and data destination information from said network; and processing circuitry for uniquely determining a function to be executed by source equipment and a function to be executed by destination equipment based on received source information and destination information, said processing circuitry indicating the functions to the source equipment and destination equipment through said network.

21. A remote control device for controlling a network including a plurality of pieces of equipment connected to said network, comprising:

communications circuitry for communicating information to said plurality of pieces of equipment in said network, data transfer source specifying circuitry for specifying equipment in communication therewith as a data transfer source; and data transfer destination specifying circuitry for specifying equipment in communication therewith as a data transfer destination other than the remote control device.

22. A remote control device, controlling a plurality of pieces of equipment through separate remote communication, comprising:

communication circuitry capable of remote communication separately with said plurality of pieces of equipment;

a receiver for receiving source information from equipment specified as a data transfer source equipment among said plurality of pieces of equipment;

a transmitter for transmitting the source information to a destination equipment among said plurality of pieces of equipment;

a first buffer for receiving information to specify a data transfer function to be executed by the source equipment from the destination equipment;

processing circuitry for applying said received information to specify the transfer function to the source equipment;

a second buffer for receiving data applied according to said specified data transfer function from the source equipment and temporarily storing the received data; and said transmitter being operable to transmit said temporarily stored data in said second buffer to the destination equipment according to said specified data transfer function.

23. Information equipment, comprising:

a functional portion for implementing a prescribed information processing function;

control circuitry for controlling said functional portion;

interface circuitry for interfacing said control circuitry and a network over which data transfer occurs between source equipment and destination equipment, said source equipment and said destination equipment including control circuitry for controlling data transfer operations; and processing circuitry for receiving source information and destination information relating to data transfers to be executed through said network, uniquely determining a data transfer function relating to said data transfer and indicating information to specify processing to be executed by the control circuitry in the source equipment and the control circuitry in the destination equipment.

24. The equipment as recited in claim 23, wherein said processing circuitry includes:

means for storing a data transfer function corresponding to a combination of source information and destination information corresponding to each of a plurality of kinds of combinations of source information and destination information in a machine-readable form;

means for extracting a data transfer function corresponding to a combination of said source information and destination information applied from said storing means;

means for indicating a plurality of transfer functions to the user when there are the plurality of transfer functions extracted by said means for extracting and allowing the user to select one transfer function; and means for indicating information to specify processing to be executed by the control circuitry in the source equipment and the control circuitry in the destination equipment according to a transfer function.

* * * * *